US008908102B1

(12) United States Patent
Crawford et al.

(10) Patent No.: US 8,908,102 B1
(45) Date of Patent: Dec. 9, 2014

(54) GENERATING AND/OR MODIFYING MOTION COMPENSATION PARAMETERS FOR VIDEO STABILIZATION

(71) Applicant: Google Inc., Mountain View, CA (US)

(72) Inventors: Andrew Joseph Crawford, Mountain View, CA (US); Damien Kelly, Sunnyvale, CA (US); Anil Kokaram, Sunnyvale, CA (US); Hugh Pierre Denman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/017,122

(22) Filed: Sep. 3, 2013

(51) Int. Cl.
*H04N 5/14* (2006.01)
*H04N 5/262* (2006.01)

(52) U.S. Cl.
CPC .................................. *H04N 5/2628* (2013.01)
USPC ........................................................... 348/699

(58) Field of Classification Search
USPC ........... 348/581, 208.12, 208.2, 208.4–208.6, 348/552, 553, 699, 700; 715/719, 716
See application file for complete search history.

(56) References Cited

U.S. PATENT DOCUMENTS

| | | | | |
|---|---|---|---|---|
| 5,173,865 A | * | 12/1992 | Koike et al. ................... | 702/155 |
| 5,488,570 A | * | 1/1996 | Agarwal ....................... | 345/501 |
| 5,511,003 A | * | 4/1996 | Agarwal ....................... | 709/204 |
| 5,864,681 A | * | 1/1999 | Proctor et al. ................ | 709/247 |
| 5,974,235 A | * | 10/1999 | Nunally et al. ............... | 709/202 |
| 6,925,195 B2 | * | 8/2005 | Cahill et al. .................. | 382/107 |
| 6,933,968 B2 | * | 8/2005 | Yamazaki ................. | 348/208.12 |
| 7,609,293 B2 | * | 10/2009 | Faulkner et al. ........... | 348/208.6 |
| 7,876,359 B2 | * | 1/2011 | von Flotow et al. ...... | 348/208.14 |
| 8,185,823 B2 | * | 5/2012 | Ubillos ........................ | 715/719 |

OTHER PUBLICATIONS

Grundmann, M., et al., "Auto-Directed Video Stabilization with Robust L1 Optimal Camera Paths," IEEE Conference on Computer Vision and Pattern Recognition (CVPR), Jun. 20-25, 2011, pp. 225-232.

* cited by examiner

*Primary Examiner* — Paulos M Natnael
(74) *Attorney, Agent, or Firm* — Amin, Turocy & Watson, LLP

(57) ABSTRACT

A system for video stabilization is provided. The system includes a media component, a transformation component, an offset component and a zoom component. The media component receives a video sequence including at least a first video frame and a second video frame. The transformation component calculates at least a first motion parameter associated with translational motion for the first video frame and at least a second motion parameter associated with the translational motion for the second video frame. The offset component subtracts an offset value generated as a function of a maximum motion parameter and a minimum motion parameter from the first motion parameter and the second motion parameter to generate a set of modified motion parameters. The zoom component determines a zoom value for the video sequence based at least in part on the set of modified motion parameters.

18 Claims, 14 Drawing Sheets

GENERATING AND/OR MODIFYING MOTION COMPENSATION PARAMETERS FOR VIDEO STABILIZATION

TECHNICAL FIELD

This disclosure relates to system(s) and method(s) for generating and/or modifying motion compensation parameters for video stabilization.

BACKGROUND

For video content recorded on a handheld device (e.g., a smart phone or a camera), video stabilization can be performed to remove unwanted video motion (e.g., unsteady or shaky video). Translational motion and/or rotational motion of unstabilized video can be estimated and removed using a translational model and/or a rotational model to generate transformed video frames. However, some or all of the transformed video frames can include black borders of unknown data as a result of the transformation.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a media component, a transformation component, an offset component and a zoom component. The media component receives a video sequence including at least a first video frame and a second video frame. The transformation component calculates at least a first motion parameter associated with translational motion for the first video frame and at least a second motion parameter associated with the translational motion for the second video frame. The offset component subtracts an offset value generated as a function of a maximum motion parameter and a minimum motion parameter from the first motion parameter and the second motion parameter to generate a set of modified motion parameters. The zoom component determines a zoom value for the video sequence based at least in part on the set of modified motion parameters.

In accordance with another implementation, a method provides for receiving a video sequence including at least a first video frame and a second video frame, calculating at least a first motion parameter associated with translational motion for the first video frame and at least a second motion parameter associated with the translational motion for the second video frame, subtracting an offset value generated as a function of a maximum motion parameter and a minimum motion parameter from the first motion parameter and the second motion parameter to generate a set of modified motion parameters, and determining a zoom value for the video sequence based at least in part on the set of modified motion parameters.

In accordance with yet another implementation, a non-transitory computer readable storage medium comprising computer-executable instructions, that in response to execution, cause a computing system to perform operations, comprising receiving a video sequence including at least a first video frame and a second video frame, calculating at least a first motion parameter associated with translational motion for the first video frame and at least a second motion parameter associated with the translational motion for the second video frame, subtracting an offset value generated as a function of a maximum motion parameter and a minimum motion parameter from the first motion parameter and the second motion parameter to generate a set of modified motion parameters, and determining a zoom value for the video sequence based at least in part on the set of modified motion parameters.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
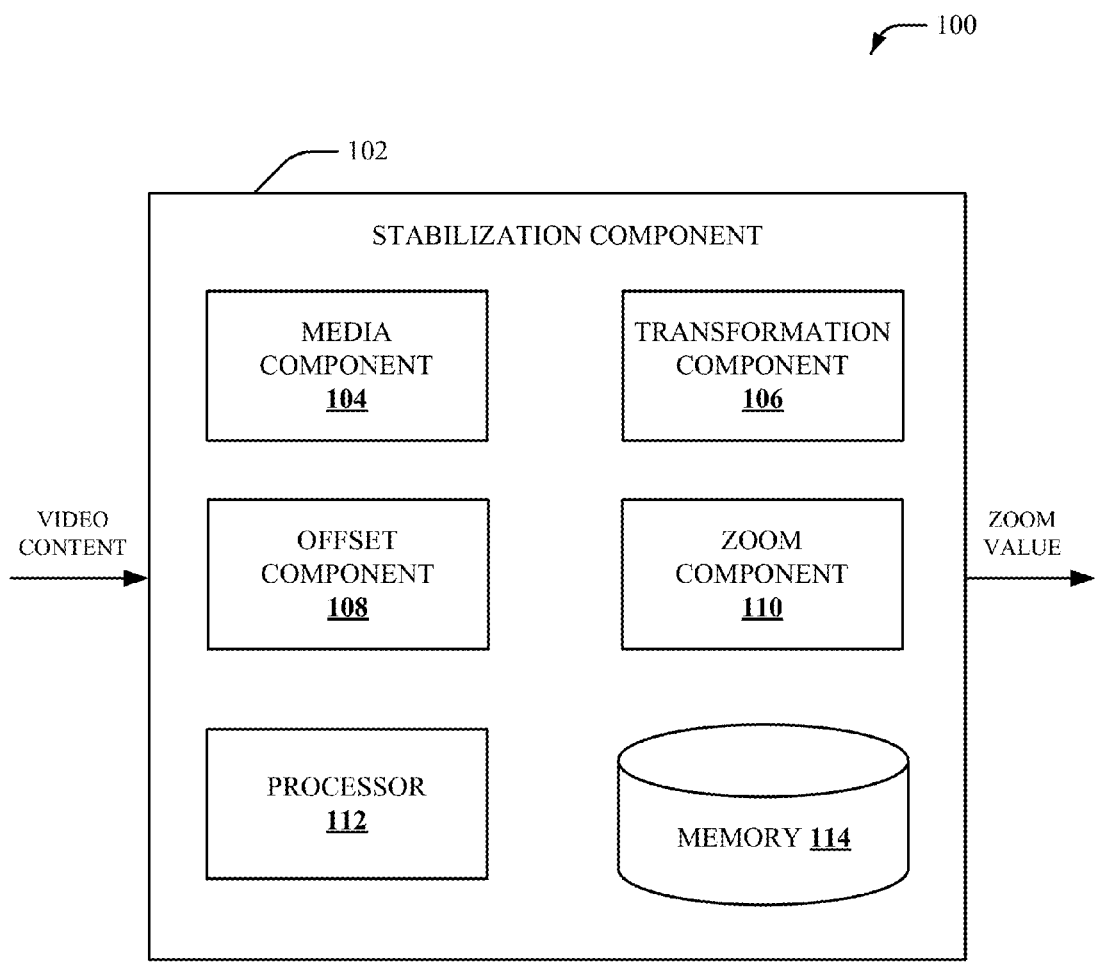
FIG. 1 illustrates a high-level block diagram of an example system to facilitate video stabilization, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

For video content recorded on a handheld device (e.g., a smart phone, a camera, etc.), video stabilization can be performed to remove unwanted video motion (e.g., unsteady or shaky video). Translational motion and/or rotational motion of unstabilized video can be estimated and removed using a translational model and/or a rotational model to generate transformed video frames. However, some or all of the transformed video frames can include black borders of unknown data as a result of the transformation. As a result, a zooming operation can be performed on the transformed video frames to remove the black borders of unknown data from the transformed video frames. For example, each of the transformed video frames can be "zoomed in" as a function of a zoom value. As such, the black borders of unknown data included in the transformed video frames can be removed from the transformed video frame (e.g., the black borders of unknown data included in the transformed video frames can be cropped out). However, it is desirable to minimize the zoom value so that the black borders of unknown data included in the transformed video frames are removed while maintaining known data in the transformed video frames (e.g., data in the transformed video frames other than the black borders of unknown data).

To that end, techniques to generate and/or modify motion compensation parameters for video stabilization (e.g., to determine a zoom value to facilitate video stabilization) are disclosed. In particular, an offset value (e.g., a global compensation offset value) can be generated to reduce (e.g., minimize) a zoom value for a video sequence. For example, the offset value can be subtracted from one or more motion compensation parameters (e.g., horizontal displacement parameter, vertical displacement parameter, rotational motion compensation parameter, other motion compensation parameters, etc.) calculated for each video frame of a video sequence. Therefore, new motion compensation parameters (e.g., modified motion compensation parameters) can be generated based on the offset value. Furthermore, the new motion compensation parameters can be utilized to calculate a zoom value for the video sequence. As such, the zoom value can be applied to each video frame in the video sequence so that each video frame in the video sequence can be cropped as a function of the zoom value. The system(s) and/or method(s) disclosed herein can be implemented independent of motion estimation. As such, the zoom value for the video sequence generated based at least in part on the offset value can be adjusted (e.g., modified) without recalculating motion estimation (e.g., without re-estimating motion) for the video sequence. Furthermore, a required zoom value to remove black borders of unknown data included in transformed video frames can be minimized and/or reduced. As a result, stabilizing video content as a function of a zoom value can be improved.

Referring initially to FIG. 1, there is illustrated an example system 100 that can provide improved video stabilization by generating and/or modifying motion compensation parameters (e.g., to determine a zoom value for video stabilization), according to an aspect of the subject disclosure. In an aspect, the system 100 can be implemented on or in connection with a device (e.g., a user device). For example, the device (e.g., the user device) can include, but is not limited to, a cellular phone (e.g., a smart phone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc. In another aspect, the system 100 can be implemented on or in connection with one or more servers (e.g., one or more servers that host user-uploaded media content). For example, the system 100 can be employed by various systems, such as, but not limited to media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, and the like.

Specifically, the system 100 can provide a stabilization component with a media feature (e.g., media component 104), a transformation feature (e.g., transformation component 106), an offset feature (e.g., offset component 108) and a zoom feature (e.g., zoom component 110) that can be utilized in, for example, a media content application (e.g., a video application). The media feature receives a video sequence including at least a first video frame and a second video frame. The transformation feature calculates at least a first motion parameter association with translational motion for the first video frame and at least a second motion parameter associated with the translational motion for the second video frame. The offset feature subtracts an offset value generated as a function of a maximum motion parameter and a minimum motion parameter from the first motion parameter and the second motion parameter to generate a set of modified motion parameters. The zoom feature determines a zoom value for the video sequence based at least in part on the set of modified motion parameters.

In particular, the system 100 can include a stabilization component 102 that includes at least a media component 104, a transformation component 106, an offset component 108 and a zoom component 110. Aspects of the systems, apparatuses or processes explained in this disclosure can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 114 for storing computer executable components and instructions. System 100 can further include a processor 112 to facilitate operation of the instructions (e.g., computer executable components and instructions) by system 100.

The media component 104 can receive video content (e.g., VIDEO CONTENT shown in FIG. 1). In one example, the video content can be user-generated video content and/or user-uploaded video content. In an aspect, a component associated with the media component 104 and/or the media component 104 can generate video content on or in connection with a device (e.g., a media capable device, a user device, etc.). In another aspect, the media component can receive video content from a device (e.g., a media capable device, a user device, etc.). For example, the device can include, but is not limited to, a cellular phone (e.g., a smart phone), a tablet, a camera, a personal computer (PC), a desktop computer, a laptop computer, a personal digital assistant (PDA), an electronic reader (e-reader), a portable computing device, an interactive television, an internet-connected television, a set-top box, a streaming media device, a gaming device, etc.

The video content can be a video sequence (e.g., a video clip, a video file, a video sample, etc.). The video sequence can include at least a first video frame and a second video frame. For example, the video sequence can include a first video frame, a second video frame, a third video frame, a fourth video frame, etc. In one example, the first video frame can be adjacent to the second video frame in the video sequence. In another example, one or more video frames can be included in the video sequence between the first video frame and the second video frame. Additionally, one or more video frames can be included in the video sequence before or after the first video frame. Additionally, one or more video frames can be included in the video sequence before or after the second video frame. In an aspect, the video content can be associated with a user (e.g., a user of a media sharing platform). For example, a user can record (e.g., capture) the video content using a handheld device (e.g., a smart phone, a camera, etc.). Furthermore, the stabilization component 102 (e.g., the media component 104) can receive the video content via the handheld device (e.g., the smart phone, the camera, etc.) or another device. It is to be appreciated that the video content can be in any recognizable and/or suitable video content format (e.g., video file format and/or audio file format), codec compression format, etc.

The transformation component 106 can calculate and/or estimate motion between video frames in the video sequence. For example, the transformation component 106 can be associated with a motion estimation process for video stabilization. In particular, the transformation component 106 can calculate one or more motion parameters for the video sequence. For example, the transformation component 106 can calculate one or more motion parameters for each frame of the video sequence. The one or more motion parameters (e.g., the first motion parameter and/or the second motion parameter) can include, but is not limited to, a horizontal translation parameter, a vertical translation parameter, a rotational parameter, another motion compensation parameter, etc. The transformation component 106 can implement a translation motion model, a rotational motion model and/or an affine motion model.

The transformation component 106 can calculate a first motion parameter associated with translational motion for the first video frame and/or a second motion parameter associated with translational motion for the second video frame. For example, the transformation component 106 can calculate a first motion parameter association with horizontal translational motion (e.g., a first horizontal translation parameter) for the first video frame and/or a second motion parameter associated with horizontal translational motion (e.g., a second horizontal translation parameter) for the second video frame. Additionally or alternatively, the transformation component 106 can calculate another first motion parameter association with vertical translational motion (e.g., a first vertical translation parameter) for the first video frame and/or another second motion parameter associated with vertical translational motion (e.g., a second vertical translation parameter) for the second video frame. Additionally or alternatively, the transformation component 106 can calculate a different first motion parameter association with rotational motion (e.g., a first rotational parameter) for the first video frame and/or a different second motion parameter associated with rotational motion (e.g., a second rotational parameter) for the second video frame. However, it is to be appreciated that other types of motion compensation parameters can be calculated for the first video frame and/or the second video frame. As such, the transformation component 106 can calculate one or more motion compensation parameters for each frame of the video sequence.

The transformation component 106 can apply a transform to the video frames of the video sequence. For example, the transformation component 106 can transform one or more frames of the video sequence to generate one or more modified video frames (e.g., one or more transformed video frames, one or more new video frames, etc.). In an aspect, at least one video frame of the video sequence can be shifted by a horizontal displacement value dx and/or a vertical displacement value dy to generate at least one modified video frame (e.g., at least one transformed video frame, at least one new video frame). As such, in an example where I is a frame in the video sequence and I' is a new frame in the video sequence, I'(x, y)=I(x+dx, y+dy).

The one or more modified video frames (e.g., the one or more transformed video frames, the one or more new video frames, etc.) can include invalid data (e.g., unknown data) as a result of the transformation. For example, one or more of the modified video frames (e.g., the one or more transformed video frames, the one or more new video frames, etc.) can include a black border of invalid data (e.g., unknown data). As such, the offset component 108 and/or the zoom component 110 can be implemented to facilitate removal of the black borders of invalid data from the one or more modified video frames.

The offset component 108 can calculate (e.g., generate, determine, etc.) one or more offset values. For example, the offset component 108 can calculate an offset value associated with horizontal translational motion, vertical translational motion, rotational motion and/or another type of motion. The offset component 108 can calculate an offset value (e.g., a first offset value) for the first motion parameter and/or the second motion parameter (e.g., the first horizontal translation parameter and/or the second horizontal translation parameter). For example, the offset value for the first motion parameter and/or the second motion parameter can be generated as a function of a maximum motion parameter and/or a minimum motion parameter. In aspect, the offset value can be a midrange value associated with the maximum motion parameter and/or the minimum motion parameter. For example, the offset value can be an average value of the maximum motion parameter and the minimum motion parameter. In an implementation, the maximum motion parameter and/or the minimum motion parameter can be the first motion parameter. In another example, the maximum motion parameter and/or the minimum motion parameter can be the second motion parameter. In yet another example, the maximum motion parameter and/or the minimum motion parameter can be a different motion parameter associated with a different video frame in the video sequence (e.g., a third motion parameter, a fourth motion parameter, etc.). The offset value can be associated with horizontal translational motion (or vertical translational motion). For example, the maximum motion parameter can be a maximum horizontal displacement value (or a maximum vertical displacement value) and the minimum motion parameter can be a minimum horizontal displacement value (or a minimum vertical displacement value).

Additionally or alternatively, the offset component 108 can calculate and/or generate another offset value (e.g., a second offset value) for the other first motion parameter and/or the other second motion parameter (e.g., the first vertical translation parameter and/or the second vertical translation parameter). For example, the other offset value (e.g., the second offset value) for the other first motion parameter and/or the other second motion parameter can be generated as a function of another maximum motion parameter and/or another minimum motion parameter. In aspect, the other offset value (e.g., the second offset value) can include a midrange value associated with the other maximum motion parameter and/or the other minimum motion parameter. For example, the other offset value (e.g., the second offset value) can be an average value of the other maximum motion parameter and the other minimum motion parameter. In one example, the other maximum motion parameter and/or the other minimum motion parameter can be the first motion parameter. In another example, the other maximum motion parameter and/or the other minimum motion parameter can be the second motion parameter. In yet another example, the other maximum motion parameter and/or the other minimum motion parameter can be a different motion parameter in the video sequence (e.g., a third motion parameter, a fourth motion parameter, etc.). The other offset value (e.g., the second offset value) can be associated with vertical translational motion (or horizontal translational motion). For example, the other maximum motion parameter can be a maximum vertical displacement value (or a maximum horizontal displacement value) and the other minimum motion parameter can be a minimum vertical displacement value (or a minimum horizontal displacement value).

Additionally or alternatively, the offset component 108 can calculate and/or generate a different offset value (e.g., a third offset value) for the different first motion parameter and/or the different second motion parameter (e.g., the first rotational parameter and/or the second rotational parameter). For example, the different offset value (e.g., the second offset value) for the different first motion parameter and/or the different second motion parameter can be generated as a function of a different maximum motion parameter and/or different minimum motion parameter. In aspect, the different offset value (e.g., the third offset value) can include a midrange value associated with the different maximum motion parameter and/or the different minimum motion parameter. For example, the different offset value (e.g., the third offset value) can be an average value of the different maximum motion parameter and the different minimum motion parameter. In one example, the different maximum motion parameter and/or the different minimum motion parameter can be the different first motion parameter. In another example, the different maximum motion parameter and/or the different minimum motion parameter can be the different second motion parameter. In yet another example, the other maximum motion parameter and/or the other minimum motion parameter can be a different motion parameter in the video sequence (e.g., a different third motion parameter, a different fourth motion parameter, etc.). The different offset value (e.g., the third offset value) can be associated with rotational motion. For example, the different maximum motion parameter can be a maximum rotational displacement value and the different minimum motion parameter can be a minimum rotational displacement value.

In an aspect, the offset component 108 can calculate and/or generate the different offset value (e.g., the third offset value) for the different first motion parameter and/or the different second motion parameter in response to a determination that the different maximum motion parameter and the different minimum motion parameter are within a certain range (e.g., the different maximum motion parameter and the different minimum motion parameter are within a certain degree value). In a non-limiting example, the offset component 108 can calculate and/or generate the different offset value (e.g., the third offset value) for the different first motion parameter and/or the different second motion parameter in response to a determination that the different maximum motion parameter and the different minimum motion parameter are within a ±45° range.

Furthermore, the offset component 108 can subtract the first offset value (e.g., the first offset value) from the first motion parameter and the second motion parameter associated with horizontal translational motion (or vertical translational motion) to generate a set of modified motion parameters. Additionally or alternatively, the offset component 108 can subtract the other first offset value (e.g., the second offset value) from the other first motion parameter and the other second motion parameter associated with vertical translational motion (or horizontal translational motion) to generate the set of modified motion parameters. Additionally or alternatively, the offset component 108 can subtract the different first offset value (e.g., the third offset value) from the different first motion parameter and the different second motion parameter associated with rotational motion to generate the set of modified motion parameters. For example, the set of modified motion parameters can include at least a first modified horizontal translation parameter, a second modified horizontal translation parameter, a first modified vertical translation parameter, a second modified vertical translation parameter, a first modified rotation parameter and a second modified rotation parameter. As such, the set of modified motion parameters can be associated with horizontal translational motion, vertical translational motion and/or rotational motion.

The zoom component 110 can generate and/or determine a zoom value (e.g., ZOOM VALUE shown in FIG. 1) for the video sequence based at least in part on the set of modified motion parameters. In an aspect, the zoom component 110 can determine the zoom value for the video sequence based at least in part on a set of zoom values generated as a function of the set of modified motion parameters. In one example, the set of zoom values can be associated with corner point values for a video frame. In another aspect, the zoom component 110 can determine the zoom value for the video sequence based at least in part on a maximum zoom value selected from the set of zoom values generated as a function of the set of modified motion parameters. In yet another aspect, the zoom component 110 can determine the zoom value for the video sequence based at least in part on a maximum zoom value that is a maximum zoom value for the video sequence generated as a function of the set of modified motion parameters. As such, a global compensation offset value generated by the offset component 108 can be utilized to reduce and/or minimize a required zoom value for a video sequence.

While FIG. 1 depicts separate components in system 100, it is to be appreciated that the components may be implemented in a common component. For example, the media component 104, the transformation component 106, the offset component 108 and/or the zoom component 110 can be included in a single component. Further, it can be appreciated that the design of system 100 can include other component selections, component placements, etc., to facilitate video stabilization.

Figure 2:
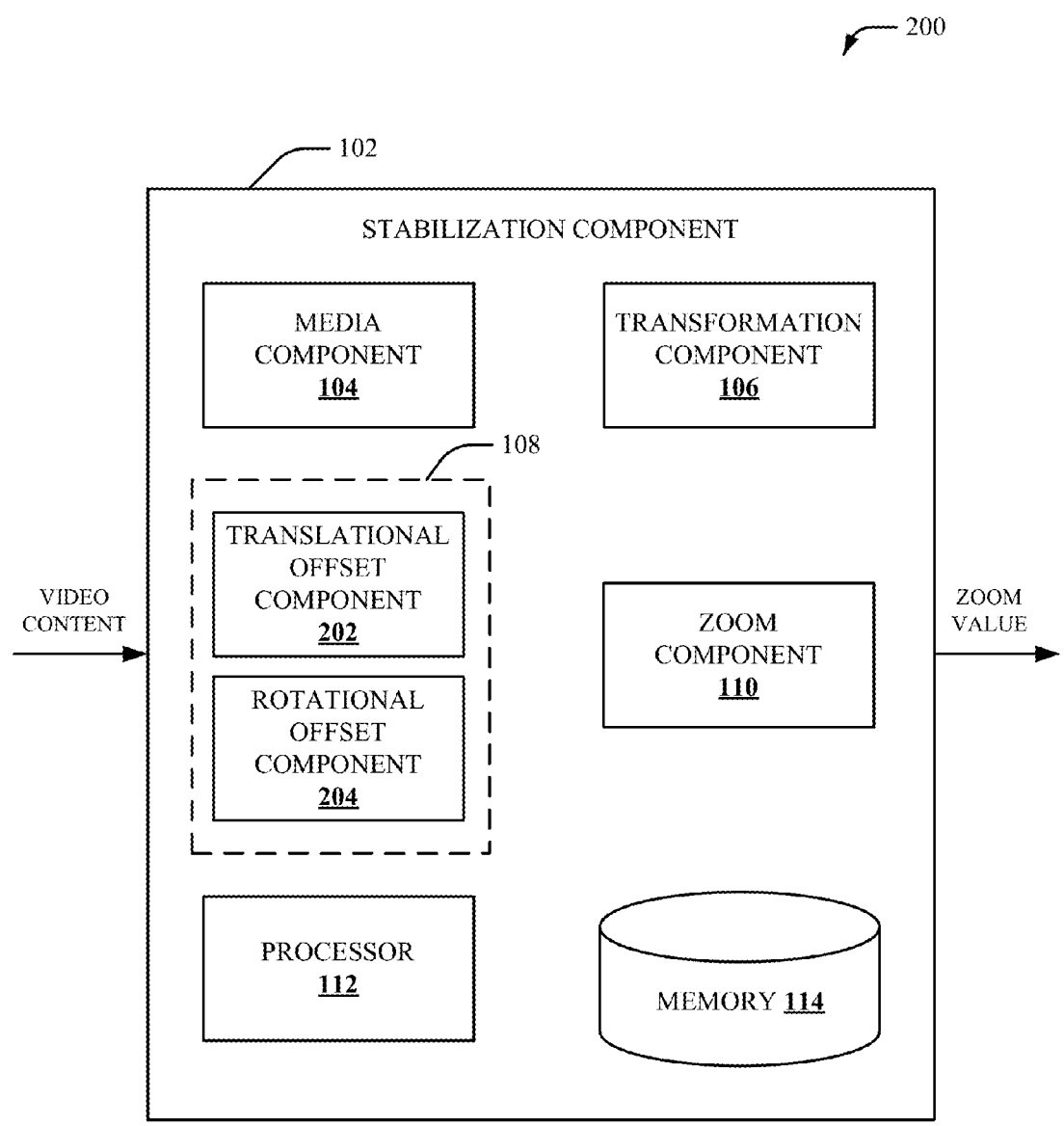
FIG. 2 illustrates a high-level block diagram of an example offset component, in accordance with various aspects and implementations described herein.

FIG. 2 illustrates a non-limiting implementation of a system 200 in accordance with various aspects and implementations of this disclosure. The system 200 includes stabilization component 102. The stabilization component 102 can include the media component 104, the transformation component 106, the offset component 108 and/or the zoom component 110. The offset component 108 can include a translational offset component 202 and/or a rotational offset component 204.

The translational offset component 202 can determine at least one offset value associated with translational motion for the first motion parameter and/or the second motion parameter. In an aspect, the translational offset component 202 can generate an offset value associated with horizontal translational motion (e.g., a first offset value, a horizontal offset value, a horizontal displacement value, etc.) for the first motion parameter and/or the second motion parameter. For example, the first video frame of the video sequence associated with the first motion parameter can be shifted by a horizontal displacement value dx to create a new first video frame. Additionally or alternatively, the second video frame of the video sequence associated with the second motion parameter can be shifted by a different horizontal displacement value dx to create a new second video frame. The horizontal displacement value dx can be an integer value and/or a non-integer value. Additionally, the horizontal displacement value dx can be interpolated from one or more neighboring pixels of a pixel coordinate x (e.g., where (x, y) is a pixel coordinate of the first video frame and/or the second video frame). The translational offset component 202 can subtract the horizontal offset value from the horizontal displacement value dx for each video frame in the video sequence.

Additionally or alternatively, the translational offset component 202 can generate an offset value associated with vertical translational motion (e.g., another offset value, a second offset value, a vertical offset value, a vertical displacement value, etc.) for the first motion parameter and/or the second motion parameter. For example, the first video frame of the video sequence associated with the first motion parameter can be shifted by a vertical displacement value dy to create a new first video frame. Additionally or alternatively, the second video frame of the video sequence associated with the second motion parameter can be shifted by a different vertical displacement value dy to create a new second video frame. The vertical displacement value dy can be an integer value and/or a non-integer value. Additionally, the vertical displacement value dy can be interpolated from one or more neighboring pixels of a pixel coordinate y (e.g., where (x, y) is a pixel coordinate of the first video frame and/or the second video frame). The translational offset component 202 can subtract the vertical offset value from the vertical displacement value dy for each video frame in the video sequence.

The translational offset component 202 can generate the offset value associated with horizontal translational motion as a function of a maximum horizontal motion parameter and/or a minimum horizontal motion parameter. In aspect, the offset value associated with horizontal translational motion can include a midrange value associated with the maximum horizontal motion parameter and/or the minimum horizontal motion parameter. For example, the offset value associated with horizontal translational motion can equal (max(dx)+min(dx))/2, where max(dx) is a largest horizontal displacement value for a video frame in the video sequence and min(dx) is a smallest horizontal displacement value for a video frame in the video sequence. In one example, the maximum horizontal motion parameter and/or the minimum horizontal motion parameter can be the first motion parameter. In another example, the maximum horizontal motion parameter and/or the minimum horizontal motion parameter can be the second motion parameter. In yet another example, the maximum horizontal motion parameter and/or the minimum horizontal motion parameter can be a different horizontal motion parameter associated with a different video frame in the video sequence (e.g., a third video frame, a fourth video frame, etc.).

Additionally or alternatively, the translational offset component 202 can generate the offset value associated with vertical translational motion as a function of a maximum vertical motion parameter and/or a minimum vertical motion parameter. In aspect, the offset value associated with vertical translational motion can include a midrange value associated with the maximum vertical motion parameter and/or the minimum vertical motion parameter. For example, the offset value associated with vertical translational motion can equal (max(dy)+min(dy))/2, where max(dy) is a largest vertical displacement value for a video frame in the video sequence and min(dy) is a smallest vertical displacement value for a video frame in the video sequence. In one example, the maximum vertical motion parameter and/or the minimum vertical motion parameter can be the first motion parameter. In another example, the maximum vertical motion parameter and/or the minimum vertical motion parameter can be the second motion parameter. In yet another example, the maximum vertical motion parameter and/or the minimum vertical motion parameter can be a different vertical motion parameter associated with a different video frame in the video sequence (e.g., a third video frame, a fourth video frame, etc.).

The translational offset component 202 can subtract the horizontal offset value from a horizontal displacement value dx determined for each video frame in the video sequence (e.g., the first video frame, the second video frame, etc.). Additionally or alternatively, the translational offset component 202 can subtract the vertical offset value from a vertical displacement value dy determined for each video frame in the video sequence (e.g., the first video frame, the second video frame, etc.). Accordingly, the horizontal offset value can be subtracted from a horizontal motion parameter and/or the vertical offset value can be subtracted from a vertical motion parameter for each video frame of the video sequence. As such, a minimum zoom value for a video frame with respect to other video frames in the video sequence can increase while a global maximum zoom value for the video sequence is reduced.

In an aspect, the translational offset component 202 can generate a translational motion model as a function of the horizontal offset value dx_offset and the vertical offset value dy_offset. For example, the translational offset component 202 can generate a translational motion model for each video frame in the video sequence such that a translational motion model M1 can be represented as, for example:

$$M1 = \begin{pmatrix} 1 & 0 & dx - dx\_offset \\ 0 & 1 & dy - dy\_offset \\ 0 & 0 & 1 \end{pmatrix}$$

Each video frame of the video sequence can be modified by a different translational motion model M1. Therefore, a horizontal displacement value dx for each video frame of the video sequence can be modified as a function of the horizontal offset value dx_offset. Additionally, a vertical displacement value dy for each video frame of the video sequence can be modified as a function of the vertical offset value dy_offset. In one example, the horizontal offset value dx_offset and/or the vertical offset value dy_offset is the same for each video frame of the video sequence. In another example, the horizontal offset value dx_offset and/or the vertical offset value dy_offset is different for one or more video frames of the video sequence.

The rotational offset component 204 can determine at least one offset value associated with rotational motion (e.g., a third offset value, a rotational offset value, a rotational displacement value, etc.) for the different first motion parameter and/or the different second motion parameter associated with rotational motion. For example, the first video frame of the video sequence associated with the different first motion parameter (e.g., first rotational parameter) can be rotated as a function of a rotational displacement value θ to create a new first video frame. Additionally, the second video frame of the video sequence associated with the different second motion parameter (e.g., second rotational parameter) can be rotated as a function of a different rotational displacement value θ to create a new second video frame. The rotational displacement value θ can be an integer value and/or a non-integer value. A video frame (e.g., the first video frame, the second video frame, etc.) can be rotated around an image center (cx, cy) by the rotational displacement value θ. The rotational offset value can be subtracted form the rotational displacement value θ for each video frame in the video sequence.

The rotational offset component 204 can generate the offset value associated with rotational motion as a function of a maximum rotational motion parameter and/or a minimum rotational motion parameter. In aspect, the offset value associated with rotational motion can include a midrange value associated with the maximum rotational motion parameter and/or the minimum rotational motion parameter. For example, the offset value associated with rotational translational motion can equal (max(θ)+min(θ))/2, where max(θ) is a largest rotational displacement value for a video frame in the video sequence and min(θ) is a smallest rotational displacement value for a video frame in the video sequence. In one example, the maximum rotational motion parameter and/or the minimum rotational motion parameter can be the first motion parameter. In another example, the maximum rotational motion parameter and/or the minimum rotational motion parameter can be the second motion parameter. In yet another example, the maximum rotational motion parameter and/or the minimum rotational motion parameter can be a different rotational motion parameter in the video sequence (e.g., a third rotational motion parameter, a fourth rotational motion parameter, etc.).

In an aspect, the rotational offset component 204 can generate a rotational motion model with rotation around an image center (cx, cy) as a function of the rotational offset value θ_offset. For example, the rotational offset component 204 can generate a rotational motion model for each video frame in the video sequence with rotation around an image center (cx, cy) such that a rotational motion model M2 can be represented as, for example:

Each video frame of the video sequence can be modified by a different translational motion model M2. Therefore, a rotational displacement value θ for each video frame of the video sequence can be modified as a function of the rotational offset value θ_offset. In one example, the rotational offset value θ_offset is the same for each video frame of the video sequence. In another example, the rotational offset value θ_offset is different for one or more video frames of the video sequence.

Figure 3:
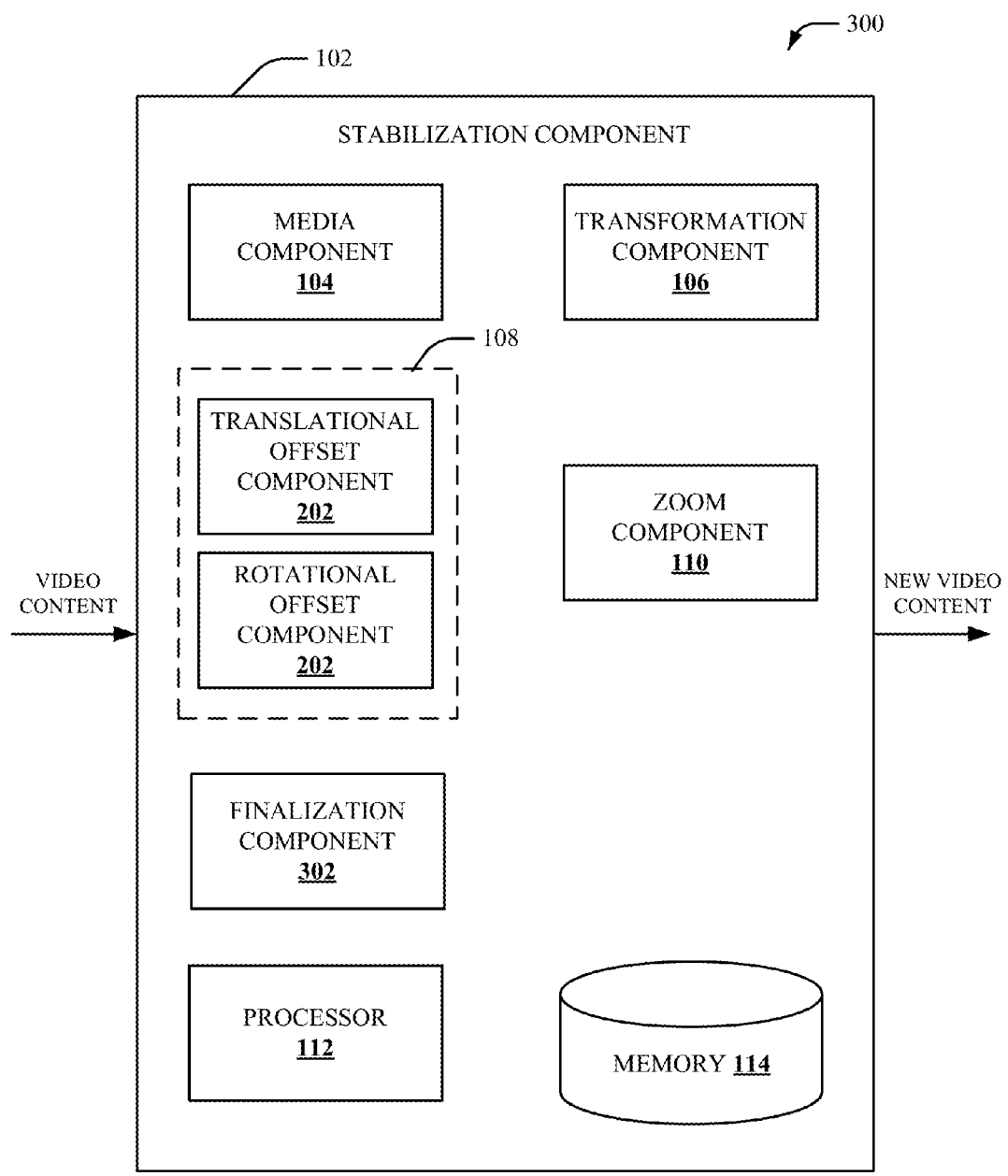
FIG. 3 illustrates a high-level block diagram of another example system to facilitate video stabilization, in accordance with various aspects and implementations described herein.

FIG. 3 illustrates a non-limiting implementation of a system 300 in accordance with various aspects and implementations of this disclosure. The system 300 includes stabilization component 102. The stabilization component 102 can include the media component 104, the transformation component 106, the offset component 108, the zoom component 110 and/or a finalization component 302. The offset component 108 can include the translational offset component 202 and/or the rotational offset component 204.

The finalization component 302 can generate new video content (e.g., NEW VIDEO CONTENT shown in FIG. 3). For example, the finalization component 302 can generate new video content (e.g., a stabilized video sequence) based at least in part on the zoom value (e.g., the zoom value generated by the zoom component 110). The new video content (e.g., the stabilized video sequence) can be generated without invalid data (e.g., video frames of the stabilized video sequence can be generated without a black border). The finalization component 302 can perform a zooming operation based on the zoom value (e.g., the finalization component 302 can "zoom in" each video frame of the video sequence by an amount equal to the zoom value). The finalization component 302 can perform the zooming operation with respect to an image center (cx, cy) for each vide frame of the video sequence. The zooming operation Z can be equal to, for example:

$$Z = \begin{pmatrix} z & 0 & (1-z)cx \\ 0 & z & (1-z)cy \\ 0 & 0 & 1 \end{pmatrix}, \text{ where } z \text{ is the zoom value.}$$

As such, the finalization component 302 can facilitate removal of invalid data (e.g., black borders) from the video sequence as a function of the zoom value.

Figure 4:
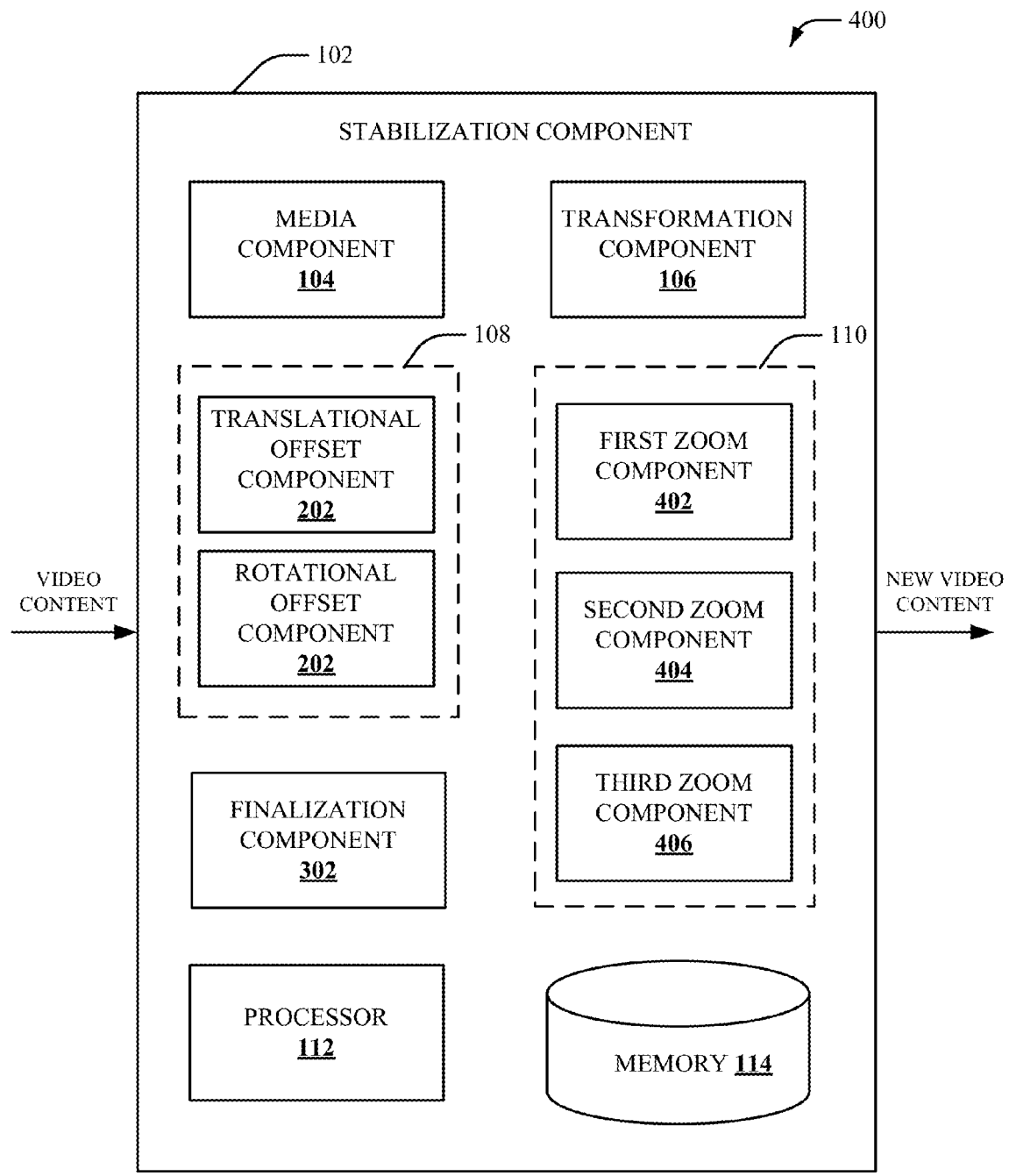
FIG. 4 illustrates a high-level block diagram of an example zoom component, in accordance with various aspects and implementations described herein.

FIG. 4 illustrates a non-limiting implementation of a system 400 in accordance with various aspects and implementations of this disclosure. The system 400 includes stabilization component 102. The stabilization component 102 can include the media component 104, the transformation component 106, the offset component 108, the zoom component 110 and/or the finalization component 302. The offset component 108 can include the translational offset component 202 and/or the rotational offset component 204. The zoom component 110 can include a first zoom component 402, a second zoom component 404 and/or a third zoom component 406.

The first zoom component 402 can generate a first set of zoom values for the first video frame based on at least the first $$M2 = \begin{pmatrix} \text{Cos}(\theta - \theta\_\text{offset}) & -\text{Sin}(\theta - \theta\_\text{offset}) & -\text{Cos}(\theta - \theta\_\text{offset})cx + \text{Sin}(\theta - \theta\_\text{offset})cy + cx \\ \text{Sin}(\theta - \theta\_\text{offset}) & \text{Cos}(\theta - \theta\_\text{offset}) & -\text{Sin}(\theta - \theta\_\text{offset})cx - \text{Cos}(\theta - \theta\_\text{offset})cy + cy \\ 0 & 0 & 1 \end{pmatrix}$$

motion parameter. Additionally, the first zoom component 402 can generate a second set of zoom values for the second video frame based on at least the second motion parameter. The first set of zoom values can be associated with corner point values for the first video frame. The second set of zoom values can be associated with corner point values for the second video frame. In one example, a plurality of first zoom values (e.g., four zoom values) can be calculated at each corner point of the first video frame. Additionally, a plurality of second zoom values (e.g., four zoom values) can be calculated at each corner point of the second video frame.

In an aspect, the first zoom component 402 can remove one or more zoom values from the first set of zoom values and/or the second set of zoom values in response to a determination that the one or more zoom values are less than a predetermined threshold level. For example, the first zoom component 402 can remove one or more zoom values from the first set of zoom values and/or the second set of zoom values in response to a determination that the one or more zoom values are associated with a corner point value within a source video frame (e.g., an original first video frame, an original second video frame, etc.).

The second zoom component 404 can determine a first maximum zoom value from the first set of zoom values. For example, the second zoom component 404 can select a largest zoom value from the first set of zoom values. Additionally or alternatively, the second zoom component 404 can determine a second maximum zoom value from the second set of zoom values. For example, the second zoom component 404 can select a largest zoom value from the second set of zoom values.

The third zoom component 406 can determine a maximum zoom value from at least the first maximum zoom value and the second maximum zoom value. For example, the third zoom component 406 can select a largest zoom value from at least the first maximum zoom value and the second maximum zoom value. In one example, the maximum zoom value can be the first maximum zoom value. In another example, the maximum zoom value can be the second maximum zoom value. In yet another example, the maximum zoom value can be a zoom value associated with a different video frame of the video sequence. Additionally, the third zoom component 406 can set the maximum zoom value as a zoom value for the video sequence.

Figure 5:
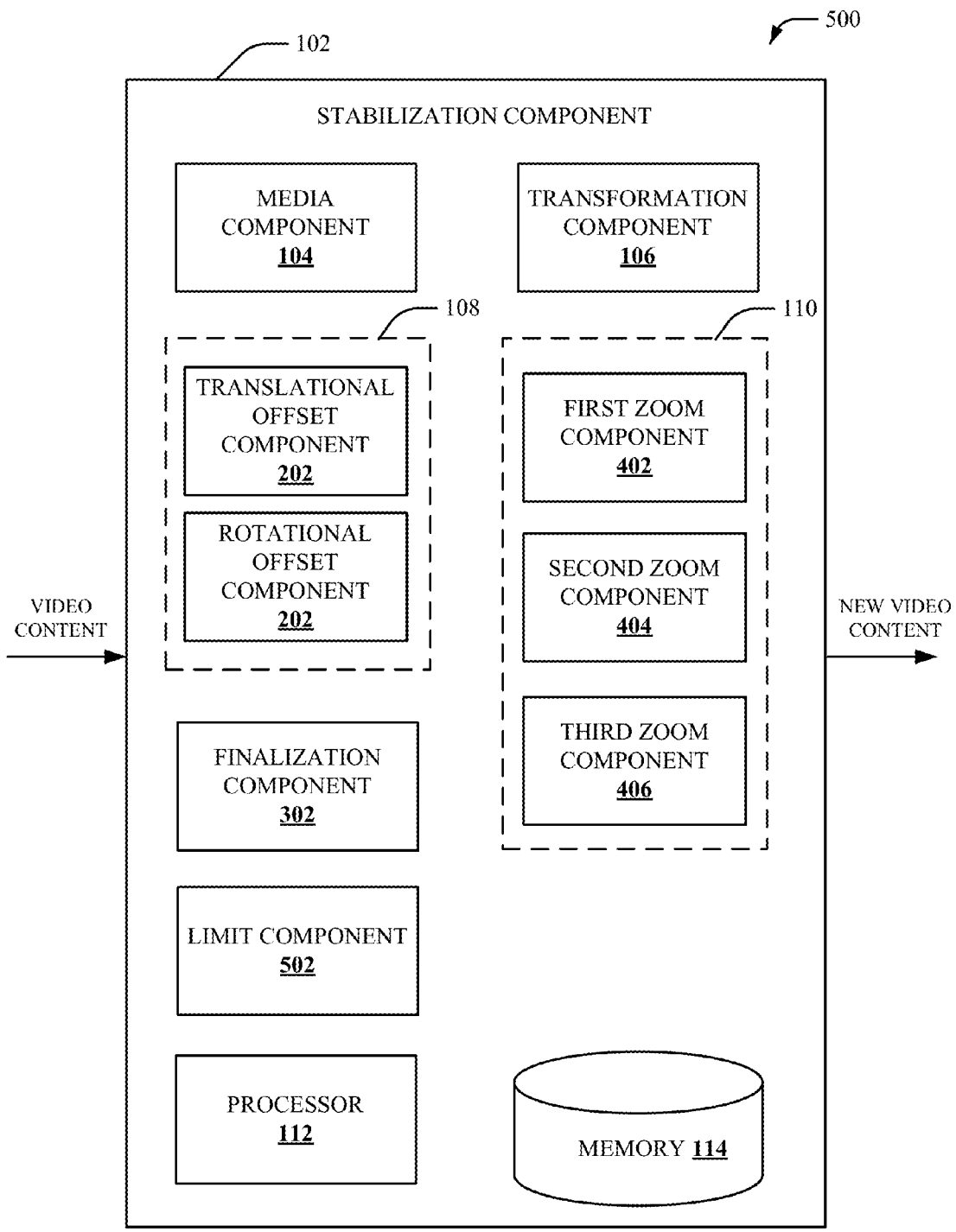
FIG. 5 illustrates a high-level block diagram of yet another example system to facilitate video stabilization, in accordance with various aspects and implementations described herein.

FIG. 5 illustrates a non-limiting implementation of a system 500 in accordance with various aspects and implementations of this disclosure. The system 500 includes stabilization component 102. The stabilization component 102 can include the media component 104, the transformation component 106, the offset component 108, the zoom component 110, the finalization component 302 and/or a limit component 502. The offset component 108 can include the translational offset component 202 and/or the rotational offset component 204. The zoom component 110 can include the first zoom component 402, the second zoom component 404 and/or the third zoom component 406.

The limit component 502 can attenuate one or more motion compensation parameters for each video frame in the video sequence in response to a determination that a zoom value is above a predetermined zoom value. For example, the limit component 502 can attenuate the first motion parameter associated with the first video frame in response to a determination that the first maximum zoom value is above a predetermined zoom value. Additionally or alternatively, the limit component 502 can attenuate the second motion parameter associated with the second video frame in response to a determination that the second maximum zoom value is above the predetermined zoom value. For example, the limit component 502 can generate a first attenuation value in response to a determination that the first maximum zoom value is above a predetermined zoom value. Additionally or alternatively, the limit component 502 can generate a second attenuation value in response to a determination that the second maximum zoom value is above a predetermined zoom value.

In one example, a first attenuation value $\alpha\_1$ can be generated as a function of a predetermined zoom value $z\_max$ and a first maximum zoom value $z_1$ associated with the first motion parameter. For example, $\alpha\_1$ can equal $(z\_max-1)/(z1-1)$. As such the, limit component 502 can multiply a horizontal motion parameter (e.g., a horizontal displacement value), a vertical motion parameter (e.g., a vertical displacement value) and/or a rotational motion parameter (e.g., a rotational displacement value) associated with the first video frame by the first attenuation value. Additionally or alternatively, a second attenuation value $\alpha\_2$ can be generated as a function of a predetermined zoom value $z\_max$ and a first maximum zoom value $z2$ associated with the first motion parameter. For example, $\alpha\_2$ can equal $(z\_max-1)/(z2-1)$. As such the, limit component 502 can multiply a horizontal motion parameter (e.g., a horizontal displacement value), a vertical motion parameter (e.g., a vertical displacement value) and/or a rotational motion parameter (e.g., a rotational displacement value) associated with the second video frame by the second attenuation value. As such, the limit component 502 can uniquely attenuate motion compensation parameter(s) for each video frame in the video sequence. In an aspect, the limit component 502 can reduce the first attenuation value and/or the second attenuation value until a new zoom value generated as a function of the first attenuation value and/or the second attenuation value is less than or equal to the predetermined zoom value.

In an aspect, the limit component 502 can attenuate the first motion parameter and/or the second motion parameter in response to a determination that the zoom value is above a predetermined zoom value. For example, the limit component 502 can generate a global attenuation value for each frame of the video sequence. As such, the limit component 502 can multiply a horizontal motion parameter (e.g., a horizontal displacement value), a vertical motion parameter (e.g., a vertical displacement value) and/or a rotational motion parameter (e.g., a rotational displacement value) for each frame in the video sequence (e.g., the first video frame, the second video frame, etc.) by the global attenuation value (e.g., by the same attenuation value).

Figure 6:
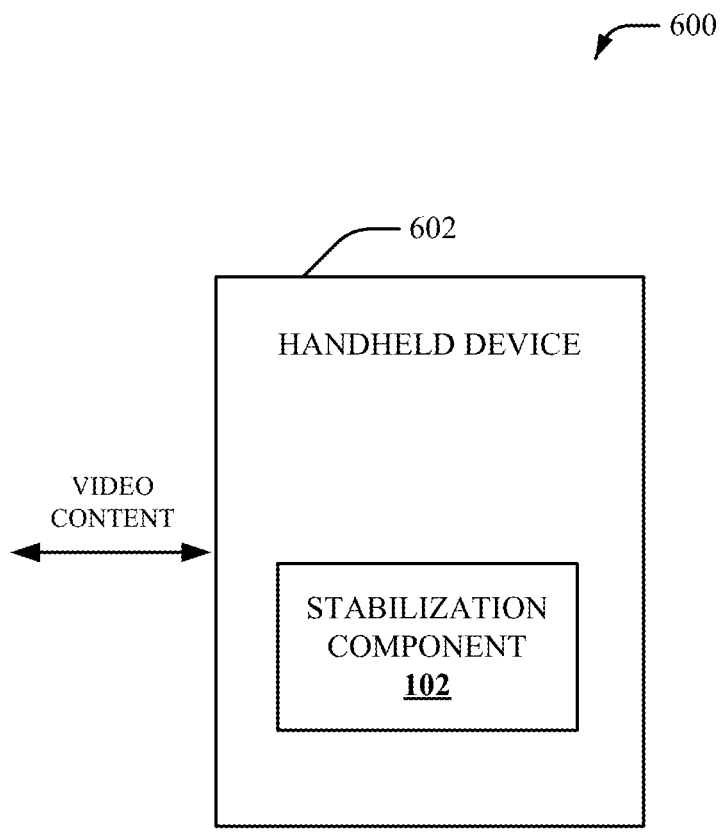
FIG. 6 illustrates example operating environment to facilitate video stabilization, in accordance with various aspects and implementations described herein.

FIG. 6 illustrates a non-limiting implementation of a system 600 in accordance with various aspects and implementations of this disclosure. The system 600 includes a handheld device 602. The handheld device 602 can include the stabilization component 102. The stabilization component 102 can include the media component 104, the transformation component 106, the offset component 108, the zoom component 110, the finalization component 302 and/or the limit component 502. The offset component 108 can include the translational offset component 202 and/or the rotational offset component 204. The zoom component 110 can include the first zoom component 402, the second zoom component 404 and/or the third zoom component 406.

The handheld device (e.g., a media capable device, a user device, etc.) 602 can include, but is not limited to, a cellular phone (e.g., a smartphone), a tablet, a camera, a personal digital assistant (PDA), an electronic reader (e-reader), a portable computing device, a streaming media device, a gaming device, another type of media capable device, etc. The handheld device 602 can be implemented to capture (e.g., record)

video content (e.g., the video sequence). Furthermore, the stabilization component 102 implemented on the handheld device 602 can be employed to generate stabilized video content (e.g., a stabilized video sequence), as more fully disclosed herein. In a non-limiting example, a user can record (e.g., capture) video content (e.g., a video sequence) using a smartphone (e.g., the handheld device 602). Furthermore, the user can stabilize the video content via the stabilization component 102 implemented on the smartphone (e.g., the handheld device 602).

Figure 7:
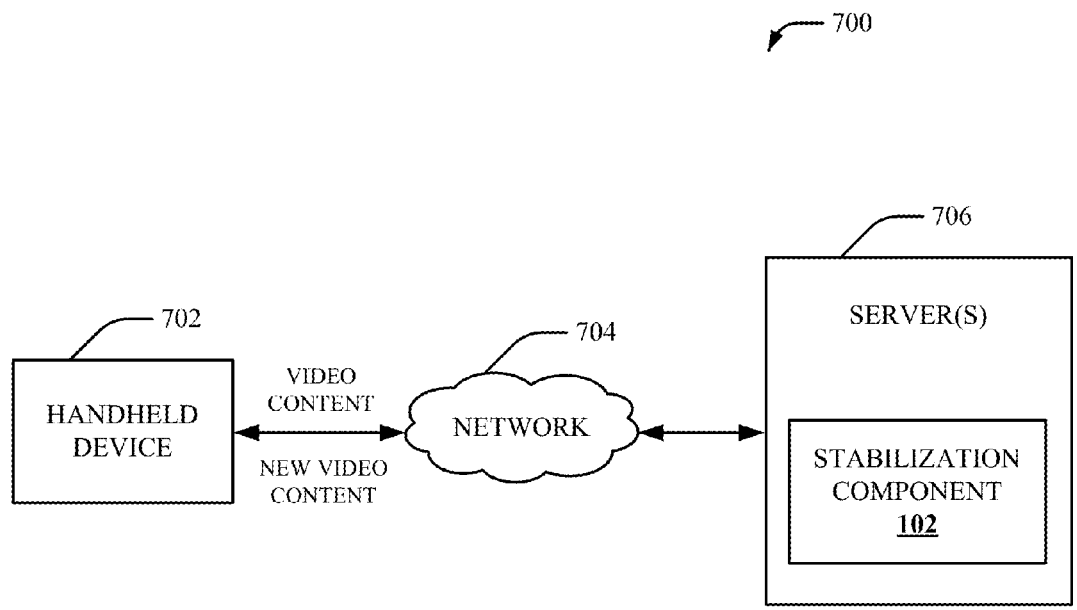
FIG. 7 illustrates another example operating environment to facilitate video stabilization, in accordance with various aspects and implementations described herein.

FIG. 7 illustrates a non-limiting implementation of a system 700 in accordance with various aspects and implementations of this disclosure. The system 700 includes a handheld device 702, a network 704 and server(s) 706. The user server(s) can include the stabilization component 102. The stabilization component 102 can include the media component 104, the transformation component 106, the offset component 108, the zoom component 110, the finalization component 302 and/or the limit component 502. The offset component 108 can include the translational offset component 202 and/or the rotational offset component 204. The zoom component 110 can include the first zoom component 402, the second zoom component 404 and/or the third zoom component 406.

The handheld device (e.g., a media capable device, a user device, etc.) 702 can include, but is not limited to, a cellular phone (e.g., a smartphone), a tablet, a camera, a personal digital assistant (PDA), an electronic reader (e-reader), a portable computing device, an interactive television, an internet-connected television, a set-top box, a streaming media device, a gaming device, another type of media capable device, etc. The handheld device 702 can be implemented to capture (e.g., record) video content (e.g., the video sequence). Furthermore, the handheld device 702 or another device can upload the video content (e.g., the video sequence) to the server(s) 706 via the network 704. Furthermore, the stabilization component 102 implemented on the server(s) 706 can be employed to generate stabilized video content (e.g., a stabilized video sequence), as more fully disclosed herein. In one example, the server(s) 706 can be implemented as media content server(s).

Figure 8:
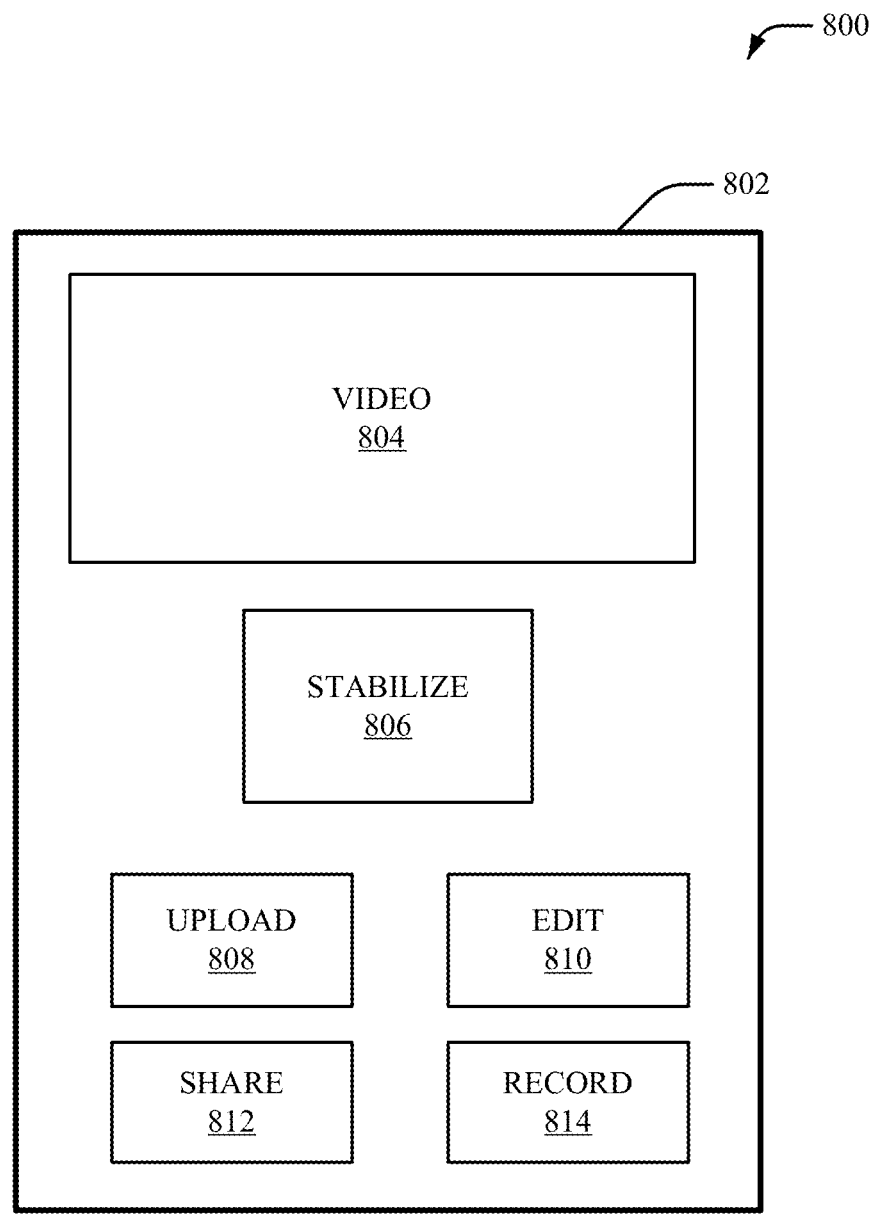
FIG. 8 illustrates an example user interface to facilitate video stabilization, in accordance with various aspects and implementations described herein.

Referring to FIG. 8, there is illustrated a non-limiting implementation of a system 800, in accordance with various aspects and implementations of this disclosure. The system 800 can be implemented in connection with the stabilization component 102 (e.g., the media component 104, the transformation component 106, the offset component 108, the zoom component 110, the finalization component 302 and/or the limit component 502). The system 800 illustrates an example user interface (e.g., a graphical user interface) 802. In an aspect, the user interface 802 can be utilized in connection with a video capture application and/or a video editing application.

The user interface 802 can be implemented on and/or accessed via a device. In an aspect, the system 800 can be implemented in association with a handheld device (e.g., handheld device 602 and/or handheld device 702) and/or server(s) (e.g., server(s) 706). For example, user interface 802 can be implemented on and/or accessed via a cellular phone (e.g., a smartphone), a tablet, a personal computer (PC), a desktop computer, a laptop computer, a personal digital assistant (PDA), an electronic reader (e-reader), a camera, a media capable device, a portable computing device, an interactive television, an internet-connected television, a set-top box, a streaming media device, a gaming device, etc. In an aspect, the user interface 802 can be accessed and/or implemented via a web service (e.g., a cloud-based service). In an aspect, the user interface 802 can be implemented in association with an application and/or a website. The user interface 802 can facilitate at least presenting and/or stabilizing video content.

The user interface 802 can include at least a stabilize option 806 for a video 804. For example, the stabilize option 806 can be utilized to stabilize the video 804, as more fully disclosed herein. In one example, the stabilize option 806 can be utilized to turn on or turn off stabilization for the video 804.

In an aspect, the user interface 802 can include an upload option 808, an edit option 810, a share option 812 and/or a record option 814. For example, a user can upload a video 804 via the upload option 808. Additionally, the edit option 810 can include video editing functionality to edit and/or augment the video 804. Furthermore, the share option 812 can facilitate distribution of the video 804 through one or more channels (e.g., social media channels, etc.). In addition, the record option 814 can be utilized to capture (e.g., record) the video 804. It is to be appreciated that the user interface 802 is merely an example. As such, the user interface 802 can include other features, content and/or functionalities not shown in FIG. 8.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 9-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 9:
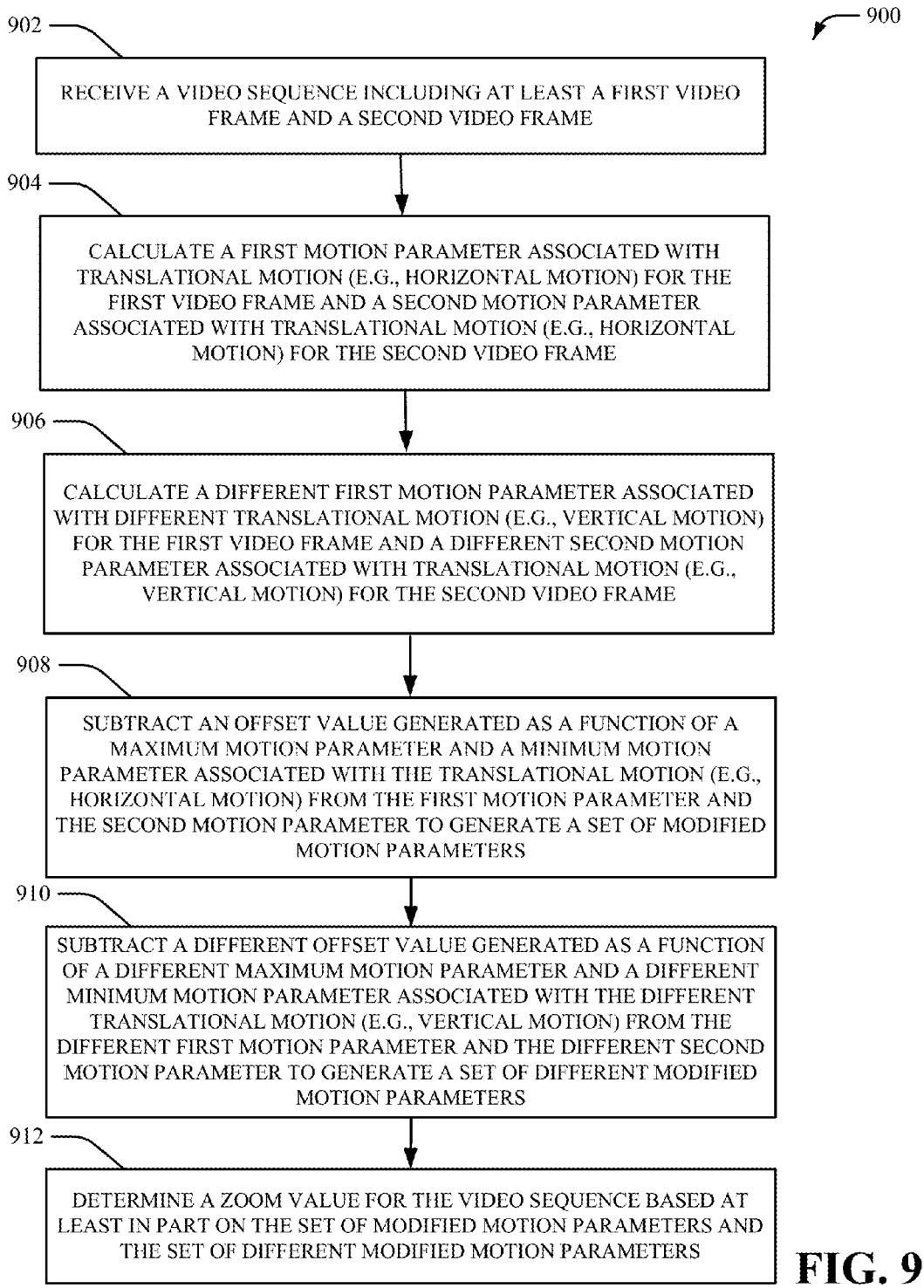
FIG. 9 depicts a flow diagram of an example method for facilitating video stabilization, in accordance with various aspects and implementations described herein.

Referring to FIG. 9, there illustrated is a methodology 900 for facilitating video stabilization, according to an aspect of the subject innovation. As an example, methodology 900 can be utilized in connection with a device (e.g., a user device) such as, but is not limited to, a cellular phone (e.g., a smartphone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc. As another example, the methodology can be implemented on or in connection with one or more servers (e.g., one or more servers that host user-uploaded media content). For example, the methodology 900 can be utilized in various applications, such as, but not limited to, media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, etc.

At 902, a video sequence including at least a first video frame and a second video frame is received (e.g., by a media component 104). For example, the video sequence can be a video sequence captured (e.g., recorded) using a handheld device. The handheld device can include, but is not limited to, a cellular phone (e.g., a smartphone), a tablet, a camera, a personal digital assistant (PDA), an electronic reader (e-reader), a portable computing device, a streaming media device, a gaming device, another type of media capable device, etc. As such, the video sequence can include unwanted motion (e.g., shaky video footage).

At 904, a first motion parameter associated with translational motion (e.g., horizontal motion) for the first video frame and a second motion parameter associated with translational motion (e.g., horizontal motion) for the second video frame is calculated (e.g., by a transformation component 106). For example, a horizontal displacement parameter can be calculated for the first video frame and a different horizontal displacement parameter can be calculated for the second video frame. The first motion parameter and the second motion parameter can be generated via a motion estimation process for video stabilization.

At 906, a different first motion parameter associated with translational motion (e.g., vertical motion) for the first video frame and a different second motion parameter associated with different translational motion (e.g., vertical motion) for the second video frame is calculated (e.g., by a transformation component 106). For example, a vertical displacement parameter can be calculated for the first video frame and a different vertical displacement parameter can be calculated for the second video frame. The different first motion parameter and the different second motion parameter can be generated via a motion estimation process for video stabilization.

At 908, an offset value generated as a function of a maximum motion parameter and a minimum motion parameter associated with the translational motion (e.g., horizontal motion) is subtracted from the first motion parameter and the second motion parameter (e.g., using an offset component 108) to generate a set of modified motion parameters. For example, the offset value can be an average value of the maximum motion parameter (e.g., maximum horizontal displacement parameter) and the minimum motion parameter (e.g., minimum horizontal displacement parameter). The maximum motion parameter (e.g., maximum horizontal displacement parameter) can be a motion parameter for a video frame of the video sequence (e.g., the first video frame, the second video frame, a different video frame, etc.) with a largest value. The minimum motion parameter (e.g., minimum horizontal displacement parameter) can be a motion parameter for a video frame of the video sequence (e.g., the first video frame, the second video frame, a different video frame, etc.) with a smallest value.

At 910, a different offset value generated as a function of a different maximum motion parameter and a different minimum motion parameter associated with the different translational motion (e.g., vertical motion) is subtracted from the different first motion parameter and the different second motion parameter (e.g., using an offset component 108) to generate a set of different modified motion parameters. For example, the offset value can be an average value of the different maximum motion parameter (e.g., different maximum vertical displacement parameter) and the different minimum motion parameter (e.g., different minimum vertical displacement parameter). The different maximum motion parameter (e.g., different maximum vertical displacement parameter) can be a motion parameter for a video frame of the video sequence (e.g., the first video frame, the second video frame, a different video frame, etc.) with a largest value. The different minimum motion parameter (e.g., different minimum vertical displacement parameter) can be a motion parameter for a video frame of the video sequence (e.g., the first video frame, the second video frame, a different video frame, etc.) with a smallest value.

At 912, a zoom value for the video sequence is determined (e.g., using a zoom component 110) based at least in part on the set of modified motion parameters and the set of different modified motion parameters. For example, the set of modified motion parameters (e.g., set of modified horizontal displacement parameters) and the set of different modified motion parameters (e.g., set of modified vertical displacement parameters) can be utilized to generate a zoom value to compensate for motion in the video sequence. As such, the zoom value can be implemented to generate a stabilized video sequence.

In an aspect, the zoom value can be determined based at least in part on a set of first zoom values for the first video frame. The set of first zoom values can be generated as a function of the set of modified motion parameters (e.g., set of modified horizontal motion parameters) and the set of different modified motion parameters (e.g., set of modified vertical motion parameters). Additionally, the zoom value can be determined based at least in part on a set of second zoom values for the second video frame. The set of second zoom values can be generated as a function of the set of modified motion parameters (e.g., set of modified horizontal motion parameters) and the set of different modified motion parameters (e.g., set of modified vertical motion parameters). In one example, the set of first zoom values can be associated with corner point values for the first video frame. Additionally, the set of second zoom values can be associated with corner point values for the second video frame. Additionally, a first maximum zoom value can be selected from the set of first zoom values and a second maximum zoom value can be selected from the set of second zoom values. The zoom value can be a maximum zoom value (e.g., a largest zoom value) selected from at least the first maximum value and the second maximum zoom value.

Figure 10:
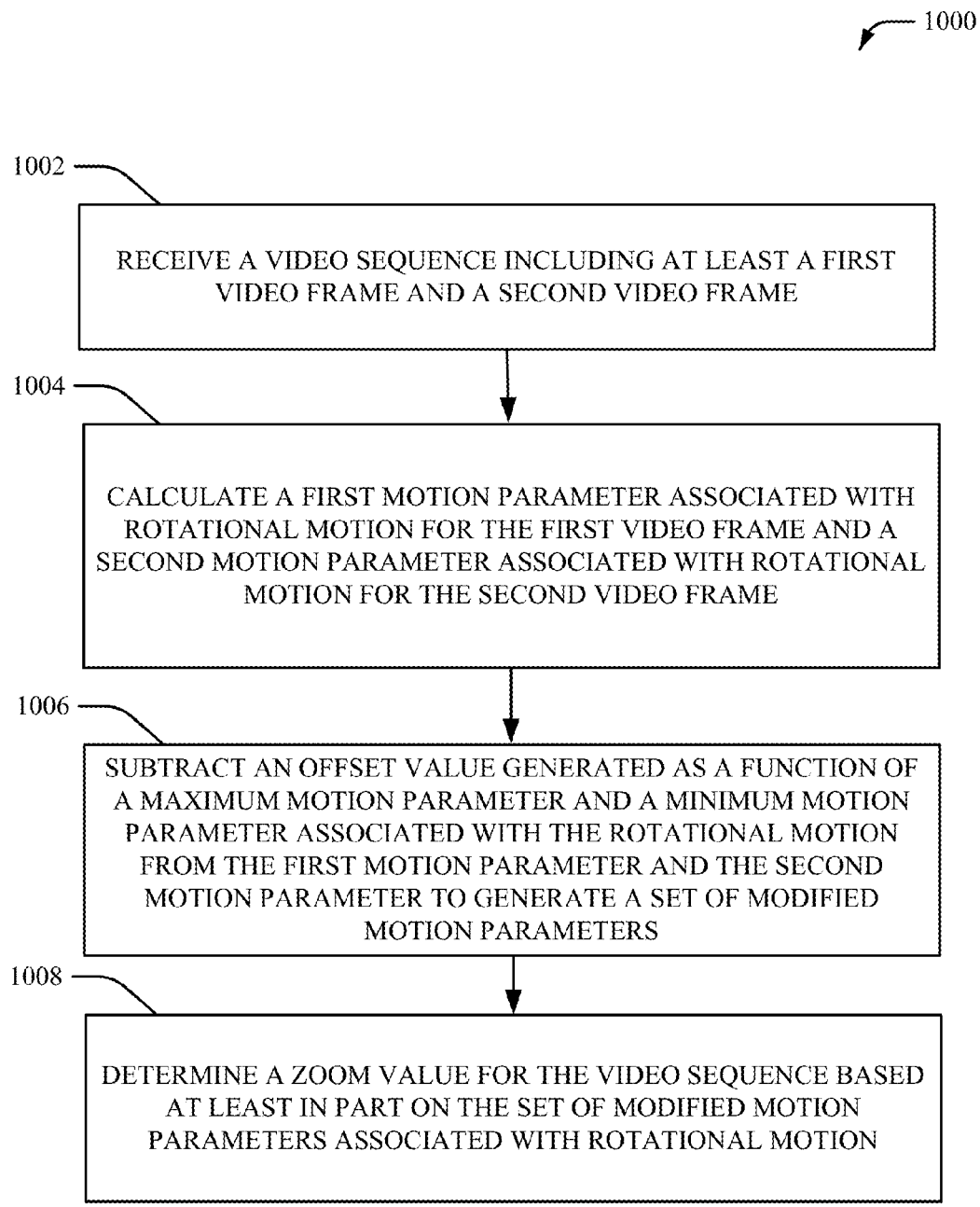
FIG. 10 depicts a flow diagram of another example method for facilitating video stabilization, in accordance with various aspects and implementations described herein.

Referring to FIG. 10, there illustrated is an example methodology 1000 for facilitating video stabilization, according to an aspect of the subject innovation. At 1002, a video sequence including at least a first video frame and a second video frame is received (e.g., by a media component 104). For example, the video sequence can be a video sequence captured (e.g., recorded) using a handheld device. The handheld device can include, but is not limited to, a cellular phone (e.g., a smartphone), a tablet, a camera, a personal digital assistant (PDA), an electronic reader (e-reader), a portable computing device, a streaming media device, a gaming device, another type of media capable device, etc. As such, the video sequence can include unwanted motion (e.g., shaky video footage).

At 1004, a first motion parameter associated with rotational motion for the first video frame and a second motion parameter associated with rotational motion for the second video frame is calculated (e.g., by a transformation component 106). For example, a rotational motion parameter can be calculated for the first video frame and a different rotational motion parameter can be calculated for the second video frame. The first motion parameter and the second motion parameter can be generated via a motion estimation process for video stabilization.

At 1006, an offset value generated as a function of a maximum motion parameter and a minimum motion parameter associated with the rotational motion is subtracted from the first motion parameter and the second motion parameter (e.g., using an offset component 108) to generate a set of modified motion parameters. For example, the offset value can be an average value of the maximum motion parameter (e.g., maximum rotational motion parameter) and the minimum motion parameter (e.g., minimum rotational motion parameter). The maximum motion parameter (e.g., maximum rotational motion parameter) can be a motion parameter for a video frame of the video sequence (e.g., the first video frame, the second video frame, a different video frame, etc.) with a largest value. The minimum motion parameter (e.g., minimum rotational motion parameter) can be a motion parameter for a video frame of the video sequence (e.g., the first video frame, the second video frame, a different video frame, etc.) with a smallest value.

At 1008, a zoom value for the video sequence is determined (e.g., using a zoom component 110) based at least in part on the set of modified motion parameters associated with rotational motion. For example, the set of modified motion parameters (e.g., set of modified rotational motion parameters) can be utilized to generate a zoom value to compensate for motion in the video sequence. As such, the zoom value can be implemented to generate a stabilized video sequence.

In an aspect, the zoom value can be determined based at least in part on a set of first zoom values for the first video frame and a set second zoom values for the second video frame generated as a function of the set of modified motion parameters (e.g., set of modified rotational motion parameters). In one example, the set of first zoom values can be associated with corner point values for the first video frame and the set of second zoom values can be associated with corner point values for the second video frame. Additionally, a first maximum zoom value can be selected from the set of first zoom values and a second maximum zoom value can be selected from the set of second zoom values. The zoom value can be a maximum zoom value (e.g., a largest zoom value) selected from at least the first maximum value and the second maximum zoom value.

Figure 11:
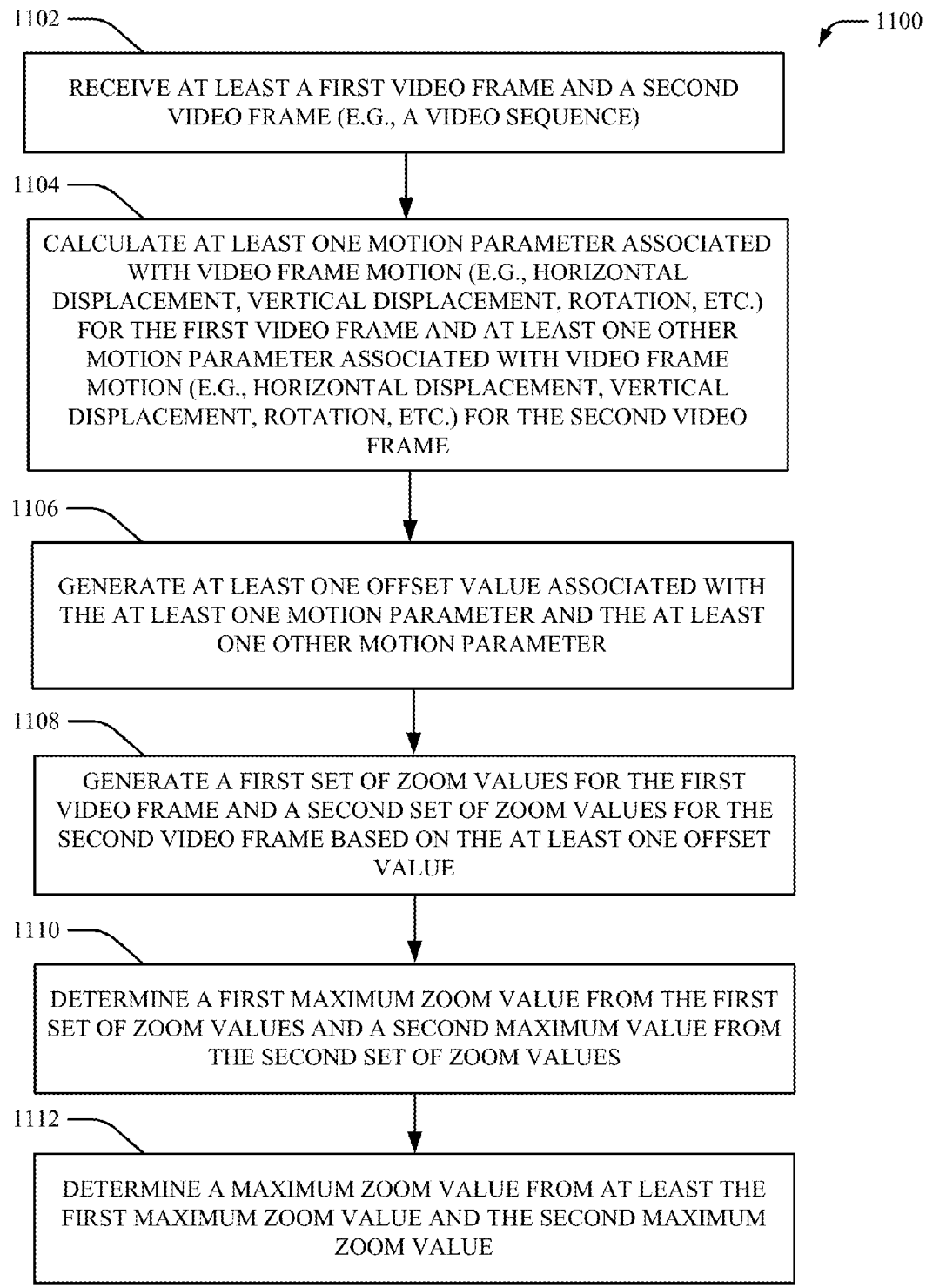
FIG. 11 depicts a flow diagram of an example method for generating a zoom value to facilitate video stabilization, in accordance with various aspects and implementations described herein.

Referring to FIG. 11, there illustrated is an example methodology 1100 for generating a zoom value to facilitate video stabilization, according to an aspect of the subject innovation. At 1102, at least a first video frame and a second video frame (e.g., a video sequence) is received (e.g., by a media component 104). For example, the first video frame and the second video frame can be included in a video sequence captured (e.g., recorded) using a handheld device. As such, the first video frame and/or the second video frame can include unwanted motion (e.g., shaky video footage).

At 1104, at least one motion parameter associated with video frame motion (e.g., horizontal displacement, vertical displacement, rotation, etc.) for the first video frame and at least one other motion parameter associated with video frame motion (e.g., horizontal displacement, vertical displacement, rotation, etc.) for the second video frame is calculated (e.g., by a transformation component 106). For example, a horizontal motion parameter, a vertical motion parameter and/or a rotational motion parameter can be calculated for the first video frame. Additionally, a horizontal motion parameter, a vertical motion parameter and/or a rotational motion parameter can be calculated for the second video frame.

At 1106, at least one offset value associated with the at least one motion parameter and the at least one other motion parameter is generated (e.g., by an offset component 108). For example, an offset value generated as a function of a mid-range value associated with the video frame motion can be generated. In one example, a first offset value associated with horizontal motion, a second offset value associated with vertical motion and a third offset value associated with rotational motion can be generated.

At 1108, a first set of zoom values for the first video frame and a second set of zoom values for the second video frame is generated (e.g., by a first zoom component 402) based on the at least one offset value. For example, at least one modified motion parameter for the first video frame and at least one other modified motion parameter for the second video frame can be generated based on the at least one offset value. The offset value can be subtracted from the at least one motion parameter to generate at least one modified motion parameter. For example, a first offset value associated with horizontal motion can be subtracted from a horizontal motion parameter associated with the first video frame, a second offset value associated with vertical motion can be subtracted from a vertical motion parameter associated with the first video frame and/or a third offset value associated with rotational motion can be subtracted from a rotational motion parameter associated with the first video frame. Additionally, the offset value can be subtracted from the at least one other motion parameter to generate at least one other modified motion parameter. For example, a first offset value associated with horizontal motion can be subtracted from a horizontal motion parameter associated with the second video frame, a second offset value associated with vertical motion can be subtracted from a vertical motion parameter associated with the second video frame and/or a third offset value associated with rotational motion can be subtracted from a rotational motion parameter associated with the second video frame. The first set of zoom values for the first video frame can be generated based at least in part on the at least one modified motion parameter and the at least one other modified motion parameter. Additionally, the second set of zoom values for the second video frame can be generated based at least in part on the at least one modified motion parameter and the at least one other modified motion parameter.

At 1110, a first maximum zoom value from the first set of zoom values and a second maximum value from the second set of zoom values is determined (e.g., by a second zoom component 404). For example, a largest zoom value (e.g., from the first set of zoom values) associated with the first video frame can be selected. Additionally, a largest zoom value (e.g., from the second set of zoom values) associated with the second video frame can be selected.

At 1112, a maximum zoom value is determined (e.g., by a third zoom component 406) from at least the first maximum zoom value and the second maximum zoom value. For example, a largest zoom value from the first set of zoom values associated with the first video frame and the second set of zoom values associated with the second video frame (e.g., a largest zoom value for the zoom values calculated for the video sequence) is selected. As such, the maximum zoom value for the video sequence can be utilized as a zoom value to facilitate video stabilization.

Figure 12:
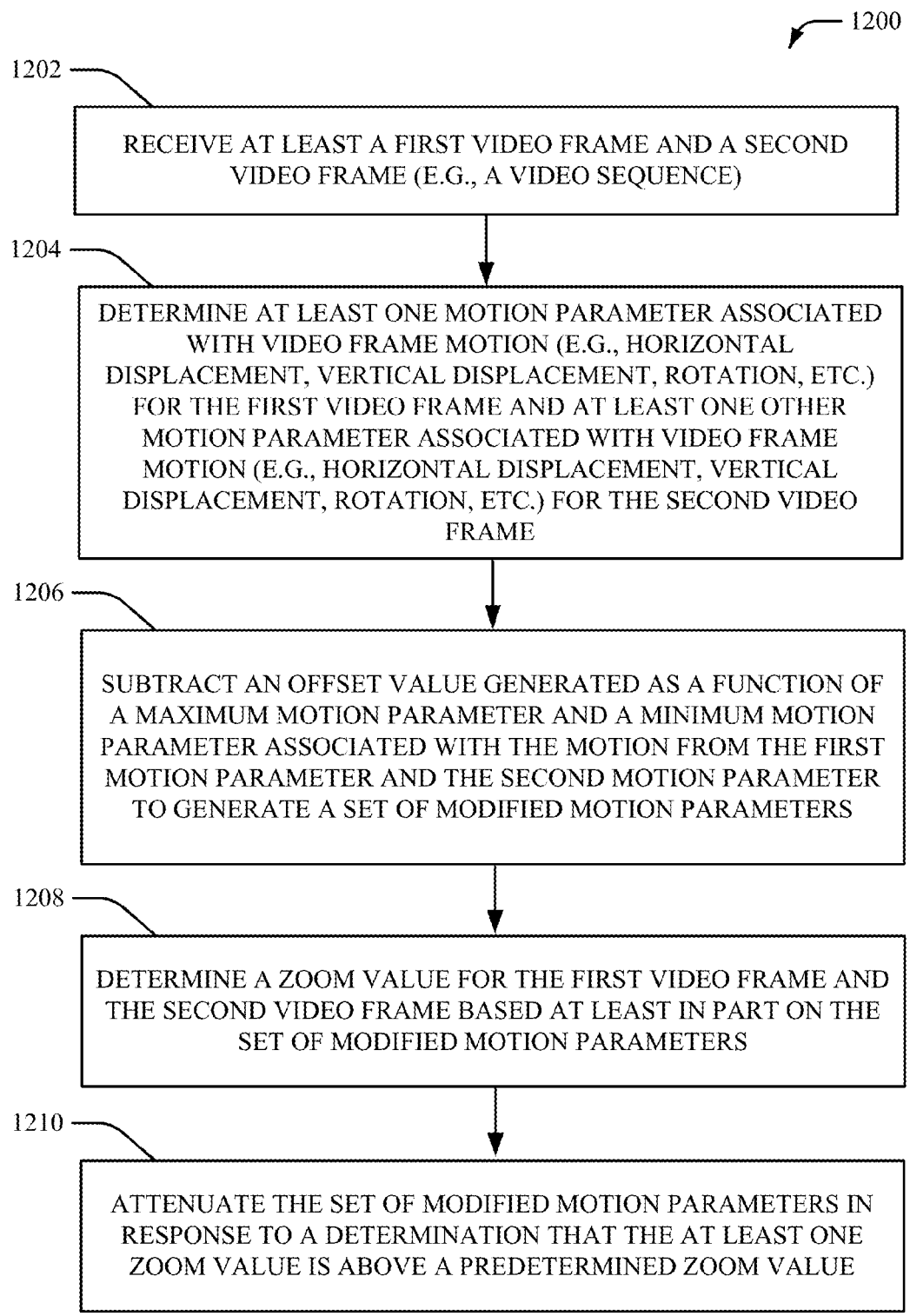
FIG. 12 depicts a flow diagram of an example method for facilitating video stabilization based on a zoom value limit, in accordance with various aspects and implementations described herein.

Referring to FIG. 12, there illustrated is an example methodology 1200 for facilitating video stabilization based on a zoom value limit, according to an aspect of the subject innovation. At 1202, at least a first video frame and a second video frame (e.g., a video sequence) is received (e.g., by a media component 104). For example, the first video frame and the second video frame can be included in a video sequence captured (e.g., recorded) using a handheld device. As such, the first video frame and/or the second video frame can include unwanted motion (e.g., shaky video footage).

At 1204, at least one motion parameter associated with video frame motion (e.g., horizontal displacement, vertical displacement, rotation, etc.) for the first video frame and at least one other motion parameter associated with video frame motion (e.g., horizontal displacement, vertical displacement, rotation, etc.) for the second video frame is determined (e.g., by a transformation component 106). For example, a horizontal motion parameter, a vertical motion parameter and/or a rotational motion parameter can be calculated for the first video frame. Additionally, a horizontal motion parameter, a vertical motion parameter and/or a rotational motion parameter can be calculated for the second video frame.

At 1206, an offset value generated as a function of a maximum motion parameter and a minimum motion parameter associated with the motion is subtracted (e.g., by an offset component 108) from the first motion parameter and the second motion parameter to generate a set of modified motion parameters. For example, an offset value generated as a function of a mid-range value associated with the maximum motion parameter and the minimum motion parameter can be generated. The offset value can be subtracted from first motion parameter to generate a modified first motion parameter. Additionally, the offset value can be subtracted from second motion parameter to generate a modified second motion parameter.

At 1208, a zoom value for the first video frame and the second video frame is determined (e.g., by a zoom component 110) based at least in part on the set of modified motion parameters. For example, the set of modified motion parameters can be utilized to generate a zoom value to compensate for motion in the video sequence. As such, the zoom value can be implemented to generate a stabilized video sequence.

In an aspect, the zoom value can be determined based at least in part on a set of first zoom values for the first video frame generated as a function of the set of modified motion parameters. Additionally, the zoom value can be determined based at least in part on a set of second zoom values for the second video frame generated as a function of the set of modified motion parameters. In one example, the set of first zoom values can be associated with corner point values for the first video frame. Additionally, the set of second zoom values can be associated with corner point values for the second video frame. Additionally, a first maximum zoom value can be selected from the set of first zoom values and a second maximum zoom value can be selected from the set of second zoom values. The zoom value can be a maximum zoom value (e.g., a largest zoom value) selected from at least the first maximum value and the second maximum zoom value.

At 1210, the set of modified motion parameters is attenuated (e.g., using a limit component 502) in response to a determination that the at least one zoom value is above a predetermined zoom value. For example, in response to a determination that the first maximum value associated with the first video frame is above a predetermined zoom value, the first modified motion parameter can be attenuated (e.g., modified as a function of an attenuation value). Additionally, in response to a determination that the second maximum value associated with the second video frame is above the predetermined zoom value, the second modified motion parameter can be attenuated (e.g., modified as a function of a different attenuation value). Therefore, a different attenuation value can be generated for each of the modified motion parameters in the set of modified motion parameters (e.g., for each video frame in the video sequence). For example, an attenuation value can be generated as a function of the predetermined zoom value and a maximum zoom value associated with a video frame (e.g., the first maximum zoom value and the second maximum zoom value).

In another example, in response to a determination that the zoom value (e.g. the maximum zoom value selected from at least the first maximum value and the second maximum zoom value) is above a predetermined zoom value, the set of modified motion parameters can be attenuated (e.g. the set of modified motion parameters can be modified as a function of an attenuation value).

Figure 13:
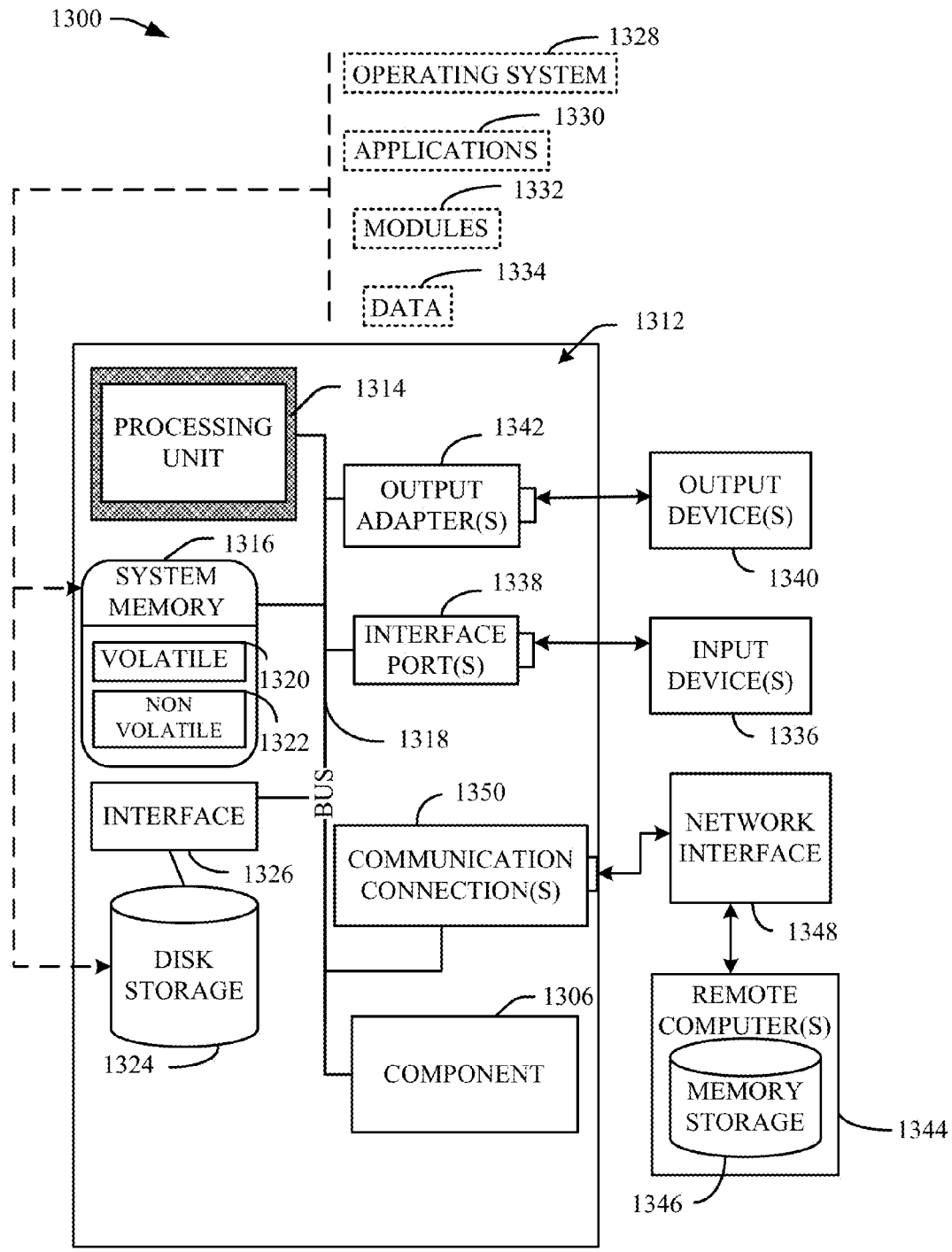
FIG. 13 is a schematic block diagram illustrating a suitable operating environment.
Figure 14:
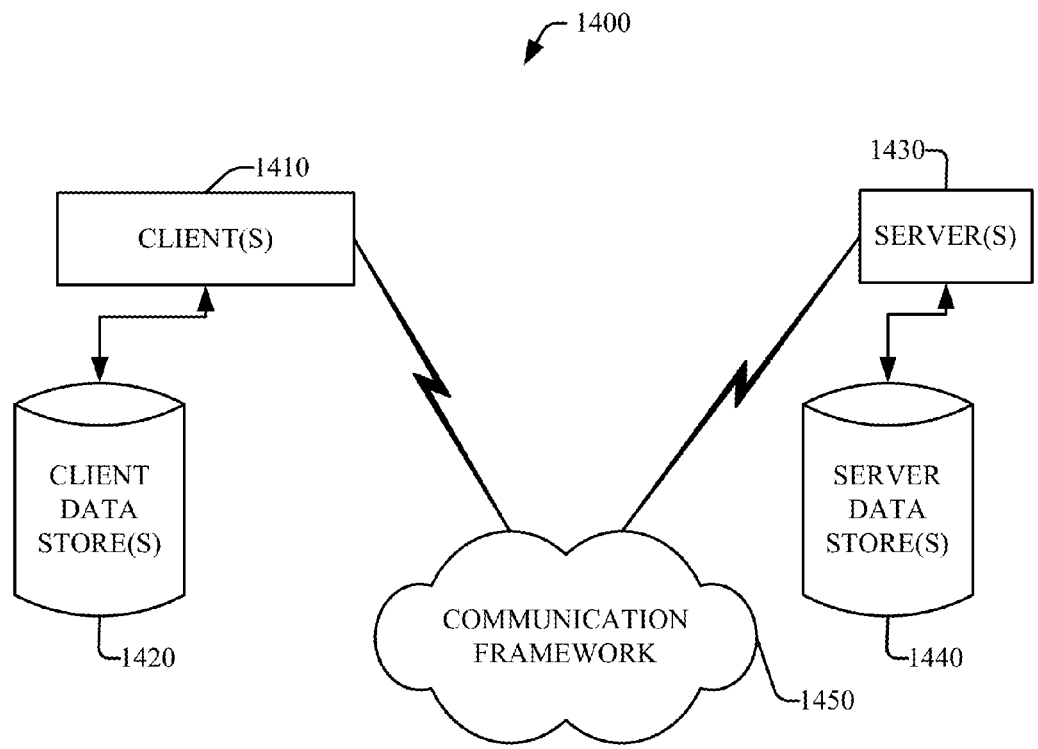
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented.

With reference to FIG. 13, a suitable environment 1300 for implementing various aspects of this disclosure includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multi-processor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 also includes removable/non-removable, volatile/non-volatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used, such as interface 1326.

FIG. 13 also depicts software that acts as an intermediary between users and the basic computer resources described in the suitable operating environment 1300. Such software includes, for example, an operating system 1328. Operating system 1328, which can be stored on disk storage 1324, acts to control and allocate resources of the computer system 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

It is to be appreciated that the computer 1312 can be used in connection with implementing one or more of the systems or components shown and described in connection with FIGS. 1-7. In accordance with various aspects and implementations, the computer 1312 can be used to facilitate video stabilization. In certain exemplary embodiments, the computer 1312 includes a component 1306 (e.g., stabilization component 102) that can contain, for example, a media component, a transformation component, an offset component, a zoom component, a translational offset component, a rotational offset component, a finalization component, a first zoom component, a second zoom component, a third zoom component and/or a limit component, each of which can respectively function as more fully disclosed herein.

FIG. 14 is a schematic block diagram of a sample-computing environment 1400 with which the subject matter of this disclosure can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing this disclosure, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1420 that can be employed to store information local to the client(s) 1410. Similarly, the server(s) 1430 are operatively connected to one or more server data store(s) 1440 that can be employed to store information local to the servers 1430.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., stabilization component, media component, transformation component, offset component, zoom component, translational offset component, rotational offset component, finalization component, first zoom component, second zoom component, third zoom component, limit component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory storing computer executable components; and
   a processor configured to execute executable components stored in the memory, the executable components comprising:
      a transformation component that calculates at least a first motion parameter associated with translational motion for a first video frame comprised in a video sequence, a different first motion parameter associated with different translational motion for the first video frame, and a second motion parameter associated with the translational motion for a second video frame comprised in the video sequence, wherein the transformational component calculates another first motion parameter associated with rotational motion for the first video frame and another second motion parameter associated with the rotational motion for the second video frame;
      an offset component that subtracts an offset value from the first motion parameter and the second motion parameter, and subtracts a different offset value from the different first motion parameter, to generate a set of modified motion parameters; and
      a zoom component that determines a zoom value for the video sequence based at least in part on the set of modified motion parameters.

2. The system of claim 1, wherein the transformation component calculates a different second motion parameter associated with the different translational motion for the second video frame.

3. The system of claim 1, wherein the offset component generates the offset value based on a maximum motion parameter and a minimum motion parameter associated with the translational motion.

4. The system of claim 1, wherein the offset component generates the offset value based on an average of a maximum motion parameter and a minimum motion parameter.

5. The system of claim 1, wherein the offset component generates the different offset value based on a maximum motion parameter and a minimum motion parameter associated with the different translational motion.

6. The system of claim 1, wherein the offset component generates the different offset value based on an average of a maximum motion parameter and a minimum motion parameter.

7. The system of claim 1, wherein the offset component generates the offset value based on a different motion parameter associated with a different video frame of the video sequence.

8. The system of claim 1, wherein the zoom component comprises a first zoom component that calculates a first set of zoom values for the first video frame and a second set of zoom values for the second video frame based at least in part on the set of modified motion parameters.

9. The system of claim 8, wherein the first set of zoom values is associated with one or more corner point values for the first video frame and the second set of zoom values is associated with one or more different corner point values for the second video frame.

10. The system of claim 8, wherein the zoom component comprises a second zoom component that determines a first maximum zoom value from the first set of zoom values and a second maximum zoom value from the second set of zoom values.

11. The system of claim 10, wherein the zoom component comprises a third zoom component that determines a maximum zoom value from the first maximum zoom value and the second maximum zoom value.

12. The system of claim 10, further comprising a limit component that attenuates the first motion parameter in response to a determination that the first maximum zoom value is above a predetermined zoom value and attenuates the second motion parameter in response to a determination that the second maximum zoom value is above the predetermined zoom value.

13. The system of claim 1, further comprising a finalization component that generates a stabilized video sequence based at least in part on the zoom value.

14. A method, comprising:
   employing a processor that facilitates execution of executable instructions stored on a non-transitory computer readable medium to implement operations, comprising:
      computing at least a first motion parameter associated with translational motion for a first video frame included in a video sequence, a second motion parameter associated with different translational motion for the first video frame, and a third motion parameter associated with the translational motion for a second video frame included in the video sequence;
      generating a set of motion parameters by subtracting an offset value from the first motion parameter and the third motion parameter and by subtracting another offset value from the second motion parameter; and
      determining a zoom value for the video sequence based at least in part on the set of motion parameters, wherein the determining the zoom value comprises calculating a first set of zoom values for the first video frame and calculating a second set of zoom values for the second video frame based at least in part on the set of motion parameters.

15. The method of claim 14, further comprising determining a first maximum zoom value from the first set of zoom values and determining a second maximum zoom value from the second set of zoom values.

16. The method of claim 15, further comprising selecting a maximum zoom value from the first maximum zoom value and the second maximum zoom value.

17. The method of claim 16, further comprising setting the maximum zoom value as the zoom value for the video sequence.

18. A non-transitory computer readable storage medium comprising computer-executable instructions, that in response to execution, cause a computing system to perform operations, comprising:

obtaining a video sequence including at least a video frame and a different video frame;

calculating at least a first motion parameter associated with translational motion for the video frame, a different first motion parameter associated with different translational motion for the video frame, and a second motion parameter associated with the translational motion for the different video frame;

determining a set of modified motion parameters by subtracting an offset value from the first motion parameter and the second motion parameter and by subtracting a different offset value from the different first motion parameter; and generating a zoom value for the video sequence, wherein the generating the zoom value comprises calculating a first set of zoom values for the video frame and calculating a second set of zoom values for the different video frame based at least in part on the set of motion parameters.

* * * * *